United States Patent
Deran

(10) Patent No.: US 11,125,675 B2
(45) Date of Patent: Sep. 21, 2021

(54) FLUID SUSPENDED PARTICLE CLASSIFIER

(71) Applicant: Roger Lawrence Deran, Soquel, CA (US)

(72) Inventor: Roger Lawrence Deran, Soquel, CA (US)

(*) Notice: Subject to any disclaimer, the term of this patent is extended or adjusted under 35 U.S.C. 154(b) by 241 days.

(21) Appl. No.: 16/657,789

(22) Filed: Oct. 18, 2019

(65) Prior Publication Data

US 2020/0096434 A1  Mar. 26, 2020

(51) Int. Cl.
  *G01N 15/14* (2006.01)
  *G06N 20/00* (2019.01)
  *G06T 7/00* (2017.01)
  *G01N 21/17* (2006.01)

(52) U.S. Cl.
  CPC ........ *G01N 15/1434* (2013.01); *G06N 20/00* (2019.01); *G01N 2015/144* (2013.01); *G01N 2021/177* (2013.01); *G06T 7/0012* (2013.01)

(58) Field of Classification Search
  CPC ............ G01N 15/147; G01N 15/1434; G01N 2015/0065; G01N 2015/144; G01N 2015/0053; G01N 2021/177; G06T 7/0012; G06N 20/00
  See application file for complete search history.

(56) References Cited

U.S. PATENT DOCUMENTS

| | | | |
|---|---|---|---|
| 4,338,024 A | 7/1982 | Boltz | |
| 5,548,661 A | 8/1996 | Price | |
| 8,812,236 B1 | 8/2014 | Freeman | |
| 8,866,063 B2* | 10/2014 | Ozcan | G03H 1/0443 250/216 |
| 9,068,916 B2 | 6/2015 | Heng | |
| 9,956,392 B2 | 5/2018 | Kaib et al. | |
| 10,359,354 B2 | 6/2019 | Fortin | |
| 10,346,972 B2 | 7/2019 | Pruneri | |
| 2007/0146873 A1* | 6/2007 | Ortyn | G02B 27/0075 359/386 |
| 2014/0030729 A1* | 1/2014 | Basiji | G01N 33/5091 435/6.14 |
| 2014/0273076 A1* | 9/2014 | Adams | G01N 15/147 435/39 |
| 2019/0219509 A1 | 7/2019 | Lo | |

* cited by examiner

*Primary Examiner* — Sang H Nguyen

(57) ABSTRACT

A fluid suspended particle classifier system detects particles of one or more classes from a predetermined recognized set of classes based on multiple images of groups of particles. An artificial intelligence classifier combines subtle clues in the images including particle morphology, size, spectral response, fluorescence, movement, density, or aggregation. Class-specific concentration estimations have a low limit of detection, and a high dynamic range. There is a tolerance for mixtures of classes of particles having widely differing sizes and concentrations. Selected particle images, histories and analysis are communicated and stored. Consumable use and manual procedures are minimized or avoided, allowing remote, unattended, real-time operation. In remote water quality monitoring, the appearance of particles resembling the *Escherichia coli* bacterium, an occasional human pathogen, causes an alarm.

18 Claims, 15 Drawing Sheets

Photomicrograph 800

Region of Interest 801

FLUID SUSPENDED PARTICLE CLASSIFIER

REFERENCES

U.S. Pat. No. 5,471,294 Ogino
U.S. Pat. No. 8,866,063 Ozcan et al
U.S. Pat. No. 10,346,972 Pruneri et al
U.S. Pat. No. 10,359,354 Fortin et al
Attachments:
File 'Fluid Suspended Particle Classifier Source Code-.txt', 128 lines.

BACKGROUND OF THE INVENTION

Field of the Invention

The invention relates to real-time remote water biological quality monitoring and in general the automatic classification, counting, concentration estimation, imaging, and analysis of particles suspended in a flowing fluid.

Prior Art

Current water quality measurement systems related to biological water content suffer from problems including the lack of real-time sensing, the need for people to do the water sample collection, delays caused by the need to culture samples, the need for limited and sometimes expensive reagents or other consumables, the need to concentrate, purify, clean, and otherwise prepare the samples, and the size, immovability, maintenance requirements, delicacy, complexity and cost of the analysis equipment such as flow cytometers if used instead of manual analysis. These limitations mean that analysis is normally performed in a laboratory rather than in the environment where the water is collected. Prior art systems provide no real-time information as to what is happening in the field where the water originates or is collected, or distributed, or at any other location where humans or animals come in contact. The limited collection sites must be relatively easy and quick for people to reach, thereby not necessarily representing the most interesting or at-risk areas. Hence biological water quality testing is infrequent, geographically limited, human-dependent, and expensive.

Prior-art water quality monitors that use wireless sensor networks can provide data in relatively real-time and in the field, but they measure only bulk properties of the water, such as temperature, pH, dissolved Oxygen, total dissolved solids, conductivity, suspended sediment, and so on. Also, organic nutrients incorporating nitrogen and phosphorus in various forms can be measured. These and other bulk properties are not used for direct determination of the biological quality of the water, but instead are used as warning indicators. Space-based measurement can map and detect potentially toxic algae blooms.

Most prior-art cell identification techniques use fluorescent labeling, in which a special-purpose species-dependent chemical is added to the water before testing. These can identify organic particles down to the species or strain. However, these and other current systems require limited or expensive reagents or other consumables, and normally require a series of pre-processing steps before the analysis. These highly specific methods detect organisms that are non-viable, i.e. which cannot grow, such as organisms that have been killed by intentional treatment or by natural causes. A detection analysis run may be restricted to only one or a few organisms that are already suspected for some reason, such as a disease outbreak or potential disease outbreak. Fluorescent labeling is not used with inorganic particles.

Sometimes routine water analysis is performed for coliform bacteria, which are indicator species, but many other un-analyzed species may be latent. A coliform bacterium is generally of a certain size, and is rod-shaped, such as *Escherichia coli*, of which certain strains are pathogenic. However, there may also be *Giardia lamblia* cysts present, which require only 10 to 100 cysts to be ingested by a person to cause disease, while there may be thousands or millions of times more organisms like bacteria or algae, or inorganics mixed with them in the water. The detection of *Giardia* requires concentration by filtration for 10.mu. m particles possibly followed by purification and sometimes culturing in special media like bile, or else they are detected clinically after people are infected.

Water in the field contains a spectrum of organic and inorganic particles of various widely varying morphologies, sizes and concentrations. Prior art systems cannot deal with this wild mixture of particles directly, thereby requiring various particle-type-specific preparation steps.

Flow cytometry is a well-established technology that focuses a stream of cells down into a single-cell width channel, and then operates on the cells individually by measuring, selecting, or counting and so on as described in U.S. Pat. No. 5,471,294 Ogino, Imaging Cytometer. In U.S. Pat. No. 10,359,354 Fortin et al. the background columns 1 line 14 to 67 and column 2 line 1 to 24 explain problems with the standard flow cytometer and the fact that cells flow in a single-cell stream. Also, testable cells are limited to the range from 0.5 um to 40 um. Fluorescent labeling is commonly used. The cells must be purified, concentrated, cleaned and possibly cultured before being analyzed, which precludes real-time in-the field monitoring and many other uses where such preparation is to be avoided. Prior-art flow cytometers are large, expensive, fixed, and not weather-proof, and are normally shared by multiple users in a laboratory, doing a sequence of individual runs. Different cytometer makes and models have different operating characteristics that are complex, and the cytometers typically need dedicated personnel to operate them. The emphasis in development of improvements in flow cytometers is on increasing the number of fluorescence excitation and emission wavelength bands for a single predetermined cell type being analyzed. Inorganic particles are not tested.

The newer micro-fluidic systems can provide a fluid moving through an extremely thin tube, but if used for flow cytometry, they have at least the limitations of prior flow cytometers, and furthermore require consumable micro-channel devices, which are physical silicon, glass, or plastic shapes often created in clean-room factories and which can therefore be expensive, or at least of finite supply.

Imaging flow cytometry is like flow cytometry, in that a stream of particles, normally cells, is hydrodynamically focused into a single-cell stream, and then imaged per-cell. This still requires preparation, to generate a series of similar cells, at least cells having a certain narrow fixed size range. As usual, fluorescence is used to bring out certain cell features, with different labels providing different emission wavelengths. The cells are concentrated before analysis.

Accordingly, it is an object of this system to avoid the capillary tube used for hydrodynamically focusing cells in flow cytometers and its associated limitations. It is another object to allow the portion of the fluid that is imaged to change over time or space without manual procedures such as collecting the fluid in a container, transporting it or placing it into an analysis machine or microscope. It is another objective to simplify and speed the analysis by minimizing or avoiding preparation of the samples by filtering, purification, concentration, fluorescent or other labeling, staining, or culturing. It is another objective to minimize or avoid the use of consumables such as microfluidic devices, or reagents such as labels or stains. It is another objective to promote remote, unattended, continuous, realtime, reliable, simple, and long-term operation. It is another object to analyze fluids and particles in motion or turbulence rather than fixed as in microscopes. It is another objective to gather information from multiple images of a fluid to allow improved gross analysis such as detecting very low particle concentrations. It is another objective to simultaneously selectively analyze multiple particle types having a wide range of combined characteristics such as size. It is another object to analyze particles non-destructively.

SUMMARY

A fluid containing suspended particles is analyzed by a sensor system by capturing multiple images of various portions of the fluid with a camera and passing them to an artificial intelligence image classifier, which is software that runs on a computer. The classifier output divides the particles into classes depending on morphology, size, color, fluorescence, aggregation, movement or other combined subtle criteria, allowing concentrations and other statistics of the particles of different classes to be determined, and also allowing selective capture and analysis of subparts of images called regions of interest based on particle class, location and analysis. Any of the particles may be organic or inorganic. Reagents such as fluorescent labels or other consumables are minimized or avoided, and pre-processing of the fluid such as filtering, purification, concentration, cleaning and culturing may be simplified or avoided. The system can run indefinitely and unattended such as remotely, with real-time output, such as with a continuously flowing fluid. Histories of the output over time provide additional useful information.

The images do not necessarily contain a concentrated group of particles as in prior art analysis systems, because many images may be observed by the camera, with a relatively small number of the images containing interesting particles. For example, the fluid may be relatively clear, or there could be common but uninteresting algae particles, or the fluid could be otherwise turbid but with traces of interesting particles. Also, the images may contain a concentrated group of particles.

This selective classification captures information about interesting particles in the presence of noise such as particles of other classes in higher concentrations or sizes. A small lower limit of detection of the interesting particles may also be reached. There is a high dynamic range, i.e. maximum and minimum measurable concentration of independent classes. Multiple classes of interesting particles can be addressed at once even if they occur together in a single image. Large co-existing particles that will not fit in a flow cytometer's 0.5.mu. m to 40.mu. m capillary can be handled. Viability of cells can be estimated by detecting that they are in dividing shapes. Quantitative measurements are possible. Cells or particles are not disturbed or destroyed and are detected in-situ and need not interact with a substrate. The fluid moves relative to the observing component in a smooth or to some degree turbulent way.

Concentrations, images of particles and images of regions of interest and other information and analysis can be exchanged with a remote computer over a communications link for interactive use by a user, or by an applications program. Local storage in the sensor system can accumulate that information for later selective navigation by a user or application program, thereby reducing overall storage and communications, while uninteresting data can be left out of or deleted from local storage when appropriate.

The above advantages and features make the system useful in many applications beyond remote water quality monitoring, such as scientific, industrial, medical, agricultural, aquatic, or other settings, for almost any kinds of particles and almost any fluid.

DETAILED DESCRIPTION

The Camera

Figure 1:
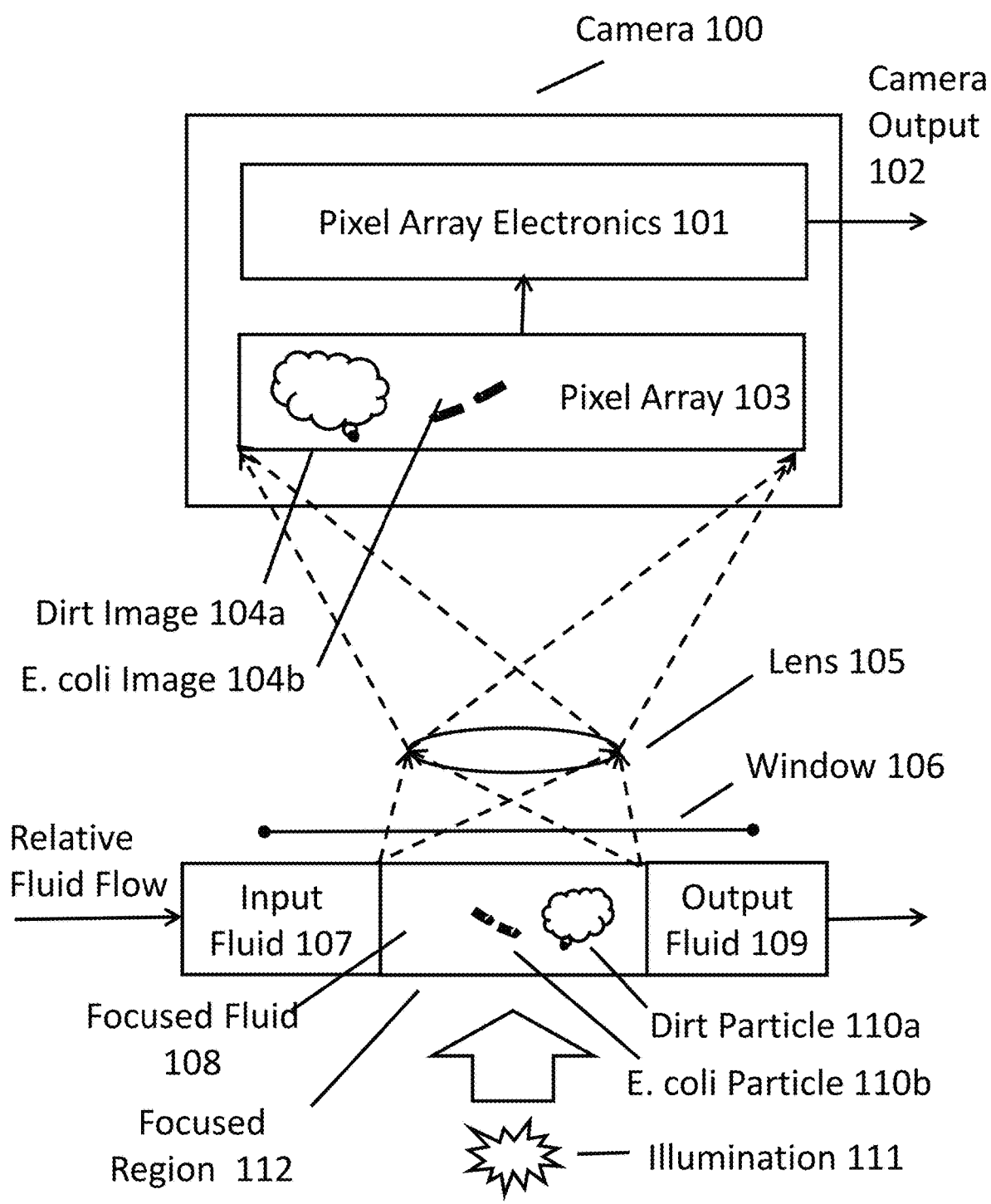
FIG. 1 is a schematic layout of the camera and optics down to the fluid, all part of the sensor system. The single lens represents the optical path, which may be more complex in practice, with a more complete diagram in FIG. 5.

For the camera 100 there are various camera technologies to select from, most appropriately these days semiconductor types such as CCD or CMOS. More sensitive technologies like Electron Multiplier CCD or Image Intensifier CCDs can be used, as can Image Intensifiers outside the camera, which would help particularly in the fluorescence case. The camera contains a pixel array of photosensitive elements 103, connected to the internal electronics 101, which outputs via connection 102 to an image capture 201 in sensor computer 200. The pixel array receives light from schematic lens 105, and it transduces the light from particle images 104a and 104b into signals to the electronics 101. The image 104a is of an inorganic particle, while 104b is of a coliform bacterium, and 110a is the actual inorganic particle, while 110b is the actual coliform bacterium in the fluid.

The resolution of the camera is as fine as possible, all else equal, but need not be so fine that it overwhelms the Artificial Intelligence i.e. AI classifier 202 in the sensor computer 200 with pixel data, which is determined by image rate and pixels per image of the camera. An image might have 5M pixels, but not all pixels need to be provided to the AI classifier, if necessary, and selected images can be presented to the AI classifier, such as every 10th, or non-empty images, or only images that are needed by the AI classifier 202 because a classification of a preceding image is complete. This selection is provided by image capture 201, operating on camera output 102.

Image capture 201 also does optional pre-processing that is to be applied to images coming from the camera, including spectral filtering, color mapping, thresholding, contrast changing, spatial filtering, temporal filtering, holographic reconstruction, momentum domain to space domain conversion, Fourier transform, among many possibilities, providing the full image stream 207.

Image capture 201 also includes the possibility of combining a plurality of received images into fewer in order to allow processing groups of images, making the system sensitive in a way that takes advantage of the fluid being in relative movement. For example, images can be overlaid, which allows a moving particle to appear as two or more adjacent particle images separated in the direction of fluid movement, and this duplication can be detected by the AI classifier 202 to reduce sensitivity to unwanted static artifacts in the image. Multiple images can be averaged to reduce noise. The AI image pre-processor 1001 may also do combining. Many other combining methods are useful.

The fluid is represented by input fluid 107 which will be imaged in the future when in the focused region 112, focused fluid 108 which is the portion being currently imaged by the camera, and output fluid 109 which has already been imaged.

The pixel array 103 may be configured as one- or two-dimensional. A one-dimensional array reconstructs two-dimensional information due to the relative motion or turbulence of the fluid, capturing pixels as time goes by, and the image capture 201 is responsible for dealing with this. In the one-dimensional case, the focused region 112 can be considered the portion of the fluid imaged 108 over a contiguous finite capture time period.

The Lens

The schematic lens 105 can be implemented as a traditional refractive or reflective curved optical component, or a holographic array, i.e. a lens-less component, as in U.S. Pat. No. 8,866,063 Ozcan or U.S. Pat. No. 10,346,972 Pruneri or other focusing means. There may be other components in the optical path to implement 105, such as a fiber-optic or optical waveguide image transporter, including other possible optical components, such as a microscope lens.

In the holographic case the image capture 201 does the necessary processing to convert the pixel array data to a space-domain image. In this case, the particle images 104a and 104b are not as shown in FIG. 1 but are instead encoded in a hologram image or wavelength-domain image received by the pixel array 103.

The Window

Figure 15:
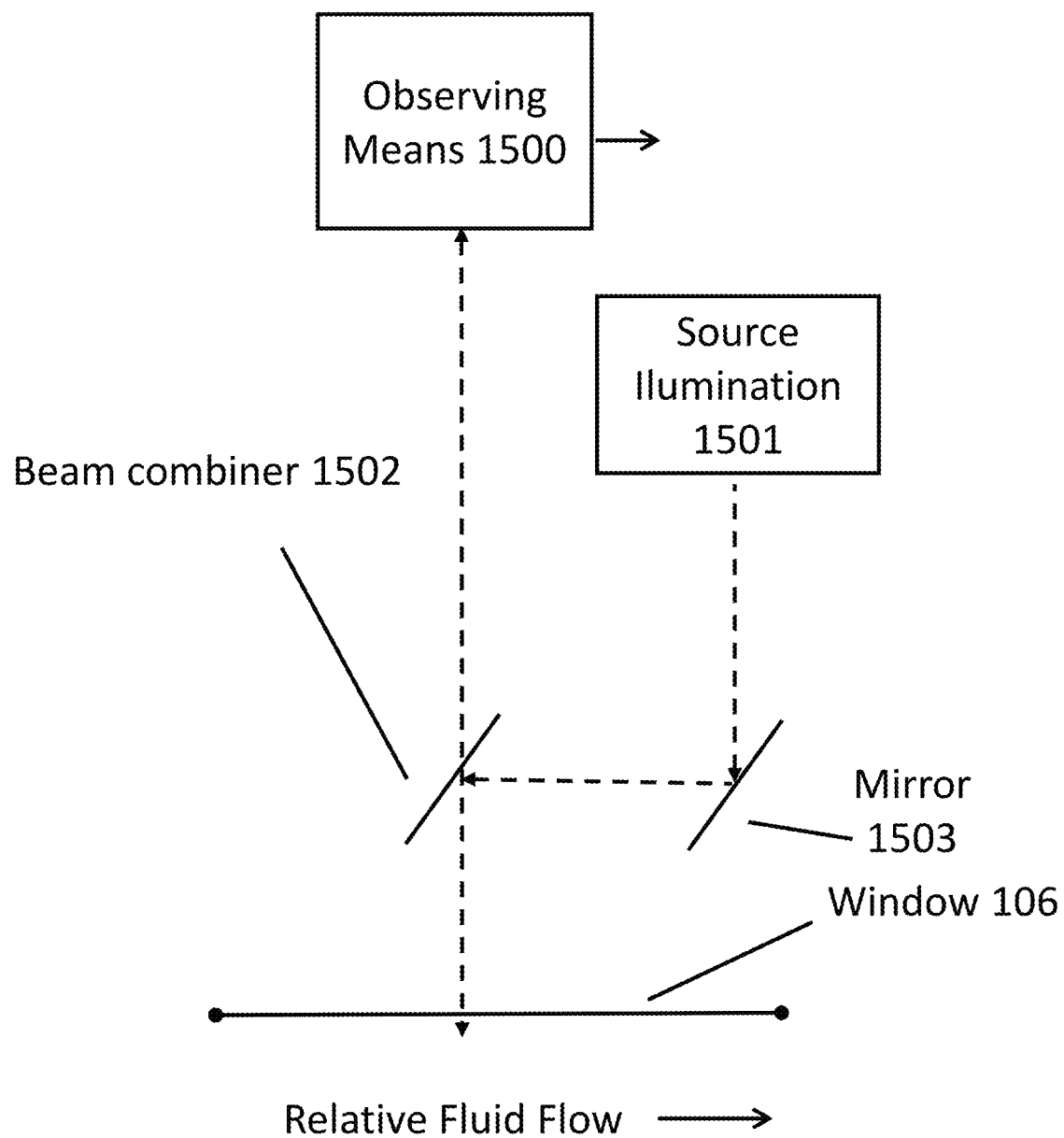
FIG. 15 shows an epi-illumination of the focused region, in which illumination reaches the focused region and the image is returned to the camera by passing two ways through the same optical path.

The fluid moves relative to the focused region 108 illuminated by a source such as a light-emitting diode, i.e. LED 111 or a laser, a mercury lamp, the sun, and so on, and then is observed by the camera or other observing means. There is a window 106 separating schematic lens 105 from the fluid. The pattern of motion of the focused fluid 108 near the window is not tightly constrained, and many patterns may work relatively well, such as straight across, or turbulent. A straight across or turbulent pattern may reduce or prevent accumulation of debris on the window, in fact sweeping it clean, possibly by the particles as some particles move past, or by a special type of added particle for that purpose. The debris could include a biofilm or general dirt. The window could be any transparent substance, glass, quartz, or the surface of the fluid or the surface of another superimposed fluid, or the internal protective front layer of the camera or pixel array sensor for example. The window can be flat, cylindrical, spherical, angled surfaces, or other shapes, on one or more sides. The window may be part of a channel containing the flowing fluid, or else the window can be exposed to an outside flow. The window may be omitted if the fluid on both sides of it are the same and can be intermixed, such as when the fluid on both sides is air, water, oil or other fluid. The fluid may have any density including zero. The source illumination 111 may have its own separate window or shine through the window or be within the fluid or be optically combined with epi-illumination as in FIG. 15.

Source Illumination Region

An illumination source 111 illuminates an illuminated region inside the fluid that is to be imaged, and the camera is focused in a focused region 112 in the fluid. The source may be focused in the focused region as well, in order to maximize the intensity of the relevant source light, or it may be unfocused. The source focused region does not have to coincide exactly with the focused region 112, so the optics are not dimensionally critical in this respect, which is advantageous.

The Focused Region

There is a certain three-dimensional region 112 inside the fluid where the camera focuses, determined by the camera's field of view and the depth of field and other things. The focused region is not necessarily coincident with the fluid-side surface of the window but can be some distance inside the fluid. By avoiding the window, debris on the window or irregularity or defects in the window or pressure or surface waves of the fluid or dynamic changes of the window will be out of focus and will tend not to affect the operation. The focused region need not be parallel to the window or the fluid flow, or even flat, but can be any shape, thus giving the optics considerable latitude in design, rigidity, and adjustment and so on. The fluid flow need not be linear or smooth but can be varying or even turbulent to some degree.

Putting the focused region at an angle can allow room for the illumination source to shine through the window also if needed, and it may increase the rate of clearance of the fluid from the focused region between images.

The focused region may include a plurality of particles, none, or only one depending on the fluid, in contrast to imaging flow cytometers, which image only one particle at a time, in strict sequence. The focused region may be much larger than the interesting particles, in order to allow a wide range of particle sizes and avoid clogging, in contrast to imaging flow cytometers, which strictly limit the particle size range so that all of the particles can fit in the narrow fluid flow and avoid clogging. Imaging flow cytometers also must focus precisely on the narrow flow channel. The focused region, being relatively large, captures a relatively large number of particles with each image, greatly increasing the rate per particle. In contrast to the focused region of imaging flow cytometers, the contents of the focused region need not contain a dense series of particles, but may from time to time contain none, or a few, or many, as the fluid flows relative to the focused region and changes in real time, thereby enabling a continuous concentration measurement. It is acceptable for the focused region to be empty for long periods of time, while an imaging flow cytometer studiously avoids empty images in order to keep up the particle analysis rate of the expensive equipment.

In one configuration the focused region is near to the surface of an image transporter such as a fiber-optic conduit or optical waveguide 1300 in effective or actual contact with the fluid, without necessarily the schematic lens 105 or window 106. The transporter may be flexible and may have a one- or two-dimensional cross-section. This configuration minimizes the size of the components near to or in the fluid, allowing working with the end of the fiber optic component more easily, making it more rugged and waterproof and allowing it to be placed in awkward locations or inserted inside of enclosed areas, such as inside living organisms.

Volume of Focused Region

It is desirable in most applications to maximize the volume of the focused region, so the depth of field should be large and the view wide without losing significant resolution in depth or width in order to maximize the amount of fluid examined for each image produced by the camera, without overwhelming the AI classifier. The width-wise resolving power of the optical system is determined by at least the diffraction limit determined by the wavelength of the source illumination, typically 200 nm to 10.mu.m for UV to IR light, and the objective lens f-number.

The depth of field can be smaller than the particles, and in the transmission case for organics, would only cause larger organisms to show up as various cross-sections. Cross-sections of microbes include more information than outlines or surfaces. A *Giardia* cyst, about 10.mu.m across, can be classified more reliably by looking inside the cross-section, because the resolving capability of the camera might be 500 nm or less. Small objects like bacteria, which may be 200 nm in diameter and 1.mu.m in length for example, will present mostly solid shapes or simple outlines and spectra rather than cross-sections.

If desired, the depth of field can be selected based on the particular use of the system at any time, such as by interposing an automatically or manually controllable iris. Also, digital de-convolution of the images can increase depth of field, but the AI classifier may already effectively de-convolve to some extent due to its great power of abstraction of shapes and particle characteristics.

Sampling

Portions of an external fluid may be sampled from time to time to become the fluid being observed by the camera within the focused region. This helps in stabilizing the particles by slowing them, hence allowing the particles to settle down for a clear image. A flashing source illumination can stabilize the image as well.

Also, the observed fluid may have a varying native velocity itself or may be artificially slowed or stopped from time to time to make the image stable, while in bulk or on average the fluid continues to flow and provide multiple images in series.

Conversely, the camera may be the primary moving part, the camera observing various parts of the fluid at different times, having the same effect as a fluid flow. Herein the flowing fluid can be read as having at least some component being a moving focused region.

The flow need not be linear or smooth but may have a varying direction. The flow may be partially or completely the result of turbulence.

The fluid flow may also be separated by constrictions such as hoses or size or cross-section shape variations of the channel. The constrictions may occur inside the input fluid, or between the input fluid and the focused region, or within the focused region, or between the focused region and the output fluid, or within the output fluid or any combination of these.

The sample channel is not necessarily completely enclosed but may be open to the flowing fluid, or there may be effectively no channel.

Image Wave Lengths

The images captured by the camera that are classified by the AI classifier can be in combinations of UV, visible, or IR wavelengths or any other wavelength spectra. The wavelengths may be wide-band or narrow-band or any spectrum. The images may be in grayscale, or color or multi-spectral or hyper-spectral, and they may pass through wavelength-selective filters before the camera. The light can be used for transmitted, absorbed or reflected images. Illumination from an angle or off-center or with a brightness gradient can help.

Infrared imaging allows microbes to be more easily observed that would be transparent in visible light. The IR can be transmitted through and detected directly by many optical systems, such as plain glass and CCD and CMOS cameras. IR wavelengths are to a certain extent organism specific. There are IR absorbance and reflectance bands specifically corresponding to C—H, C=O, and C—O bonds. Many substances and conditions in a cell affect the spectra. IR images will have less resolution than UV or visible, as image resolution is limited by at least the diffraction limit determined by wavelength. Long-wave IR does not penetrate water very far, however.

Particle Morphologies

Particles can be differentiated and classified by their morphologies appearing in images, including shape, size, internal structure, and arrangement among other characteristics such as color, with green or cyan common for algae. Shapes of bacteria can include spheres i.e. cocci, spirals, rods i.e. bacilli, crescents and more. Arrangements i.e. aggregations for cocci include single, diplococci i.e. pairs, *streptococcus* i.e. chains, *staphylococcus* in grape-like clusters, and tetrad and more, while bacilli can be single, diplobacilli i.e. pairs, streptobacilli i.e. chains and so on. In addition, flagella, which propel the organism, can occur in various numbers and location on the surface, projecting outwards from some organisms. Some bacteria can form spores, which are differentiable from non-spores. Cysts, such as the pathogen *Giardia lamblia*, which are larger, have more visible internal detail than bacteria, as well as more possible shapes, including some morphologies that are easily differentiable, such as *Giardia* trophozoites. Larger morphologically differentiable particles can be algae, organic aggregations, inorganic particles or many other possibilities.

A given type of particle will have a variety of shapes when observed at various positions relative to the focused region, so for example, a bacterium may be an outline when at the edges of the focused region, or a dark blob when nearer the middle. The AI classifier can classify based on the entire set of possible shapes and orientations associated with a particle type.

Dynamic Particle Images

The captured images need not be of distinct portions of the fluid but may also include overlapping portions. Overlapping portions allow improved particle recognition and classification, such as by allowing the multiple images of individual particles that appear in multiple images to reach the AI classifier, which can combine that information with the rest. Such a duplicated particle image can be called a dynamic particle image. One way to incorporate the multiple images going into the AI classifier 202 is to put them in as replacements for one or more of the three color channels, or to add them as additional channels, among many other possibilities. Using multiple channels for the various colors and overlapping images will tend to show the multiple images of individual particles close together if the fluid is moving slowly or the illumination is appropriately flashed, which will help in classification.

Bacteria and other organic particles sometimes alter position dynamically using flagella, or they change shape by growing and dividing, or they move by Brownian motion. Particles that rotate in space will have different shapes in different images. A *bacillus*, which is a rod shape, may rotate from a disk to a linear pattern depending on orientation. Particles with a long axis may tend to orient themselves with their long access parallel to the window hence will be more differentiable from spheres due to the shearing laminar flow of the fluid near the window, or those particles may tend to rotate. Particles with discernable internal structure, such as cysts or algae or plankton may show different patterns as they move and rotate, which will aid in classification.

Smeared Spectral Response

Figure 14:
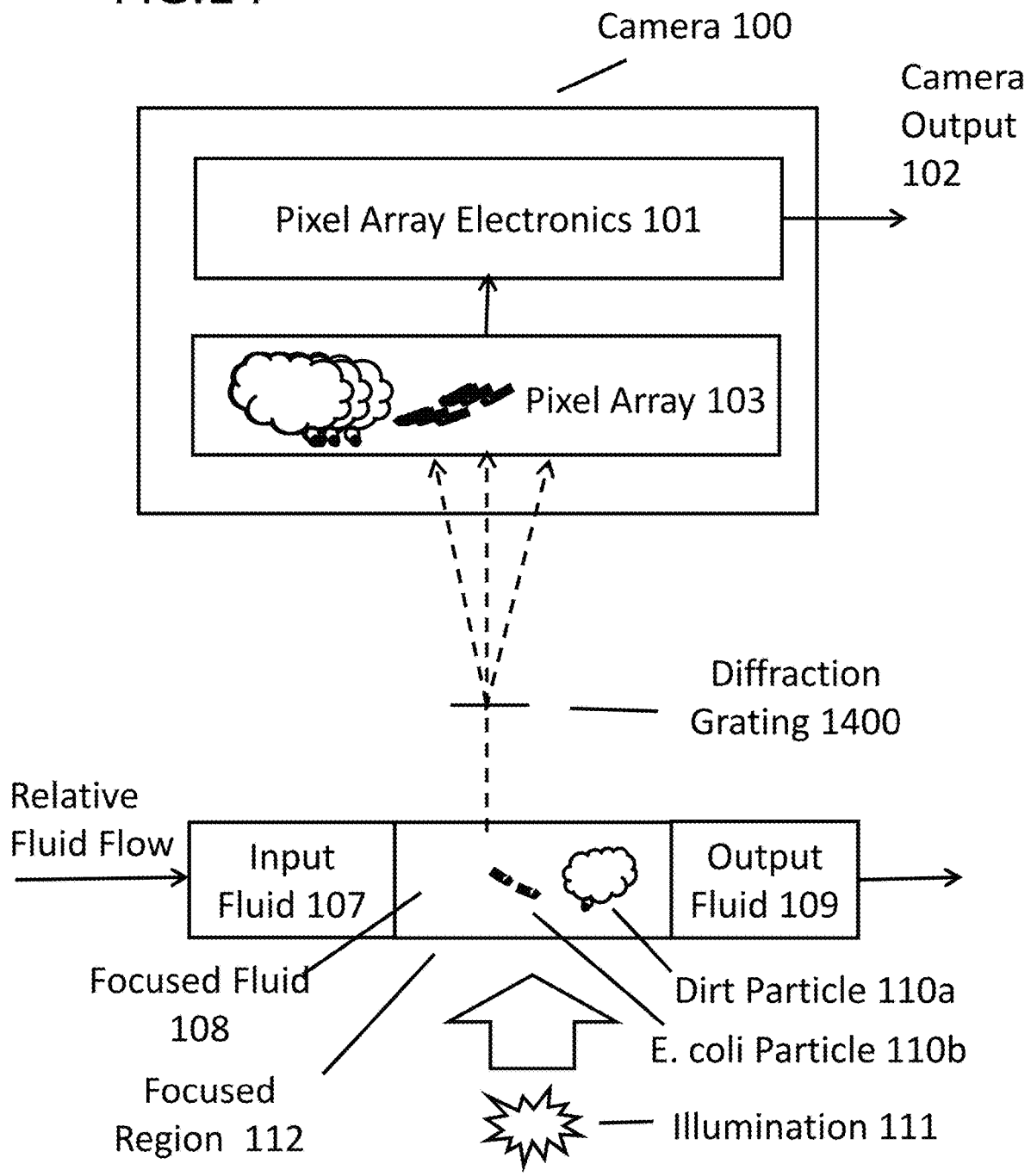
FIG. 14 shows the smeared images in the pixel array resulting from a wavelength-dependent optical component such as a diffraction grating, prism, or uncorrected lens.

The images can be distorted as shown in FIG. 14 by a diffraction grating 1400 or prism or other wavelength-dependent directional optical component placed in the optical path somewhere before the camera in order to separate each particle's image into a spectrum smeared across the image, thereby adding information to the image for the AI classifier, yielding better classification results. This also can reduce the number of channels required, so for example, a smeared image can be represented in one channel as gray scale, thereby freeing two of the RGB channels for other purposes. A lens system having imperfect chromatic correction will distort images dependent on the spectrum of the components of the source image as well, whether the light is UV, visible, or IR. This technique is used with astronomical telescopes to smear objects across the image according to the spectrum of each object, and it works well when the image contains relatively well separated distinct objects. The information captured by the smearing is more than the three real numbers for three RGB channels, because the spectrum is fine-grained, and the smeared area can cover more than three pixels. The AI classifier needs little or no special adaptation in order to integrate this spectral information with other clues, and it will learn the overall patterns based on training on images having smeared particle images.

Particle Fluorescence

Fluorescence of the particles can be used as well, and many types of organic and inorganic materials fluoresce in specific excitation and emission wavelengths which can be filtered in or out. There is a two-dimensional pattern of emission as a function of excitation wavelength available to be used in classification. The emission is always at a longer wavelength than the excitation.

In case the source illumination excitation is UV and the source illumination passes through the window, the window may be of quartz i.e. fused silica, or other UV-passing glass or substance such as the surface of the fluid. Such a window also allows the emission light to pass through, even if it is also UV.

It may be necessary to filter out unwanted Infrared if it is present, because semiconductor cameras are sensitive to it. If the source illumination is wideband, it can be filtered down to a narrower bandwidth to minimize undesired fluorescence, such as from minerals. An optical filter can be a flat sheet or lens or component of other shape of glass or plastic with certain characteristics. Filtering out the excitation so it does not reach the camera can also help.

Intrinsic Fluorescence of Organic Particles

To differentiate inorganic from organic material, intrinsic i.e. native ultraviolet fluorescence can be used. For organic material, the approximate 280 nm UV excitation wavelength produces emission at approximately 350 nm, which is also UV. This pattern is provided by fluorescence of the amino acid Tryptophan, which occurs in virtually all proteins, hence virtually all organic substances are detectable. The amino acids Tyrosine and Phenylalanine also fluoresce somewhat but at different wavelengths, so their fluorescence could provide more information as well. Some inorganic substances such as some minerals also fluoresce in ultraviolet light, but the excitation and emission wavelengths are different to a certain extent, so the intrinsic fluorescence can be selected for with optical filters.

Figure 6:
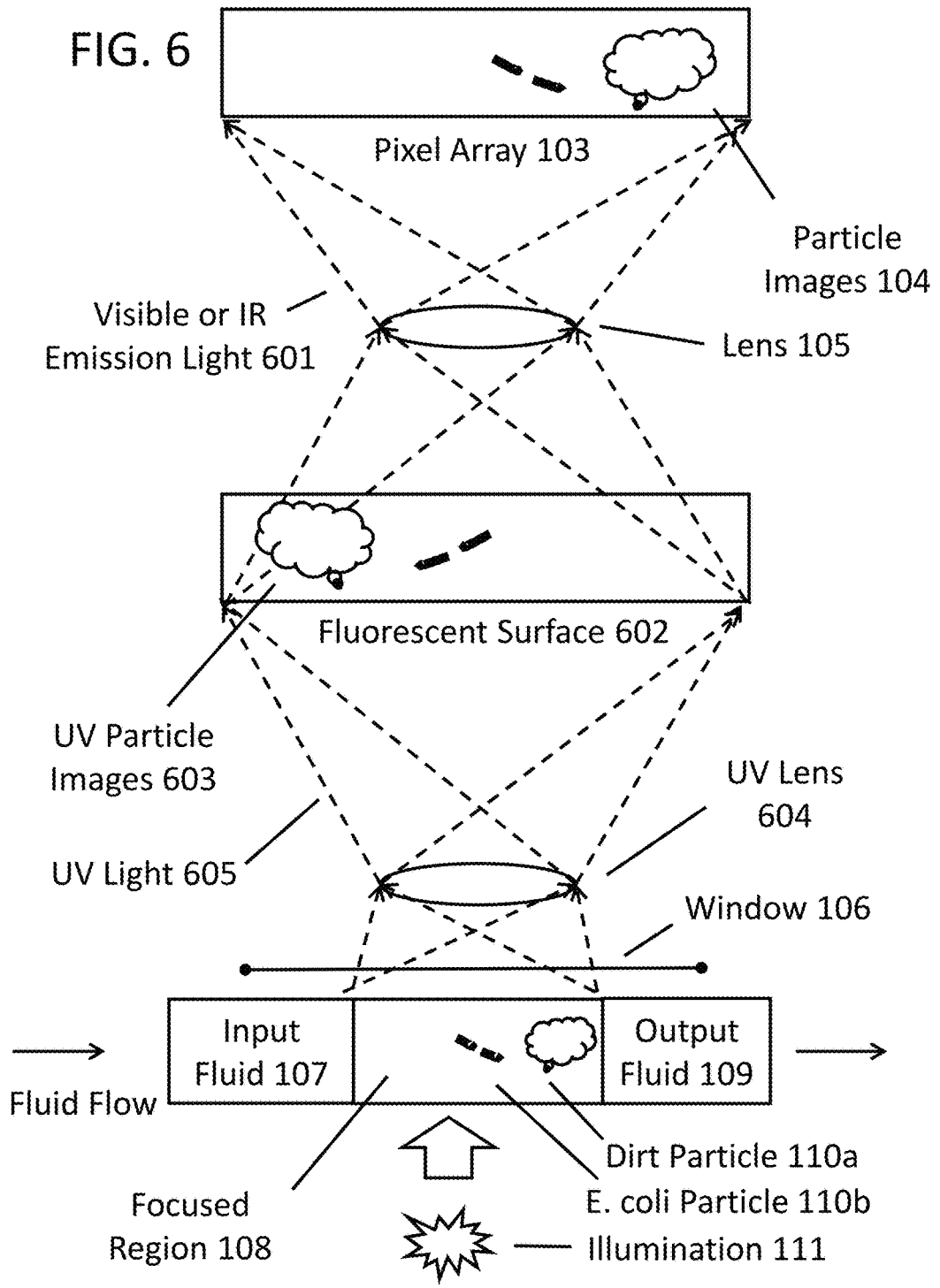
FIG. 6 shows schematically the conversion of a fluorescent UV emission, transmitted UV, or reflected UV from the particle into visible or IR light that can pass through typical lenses and be detected by the camera.
Figure 7:
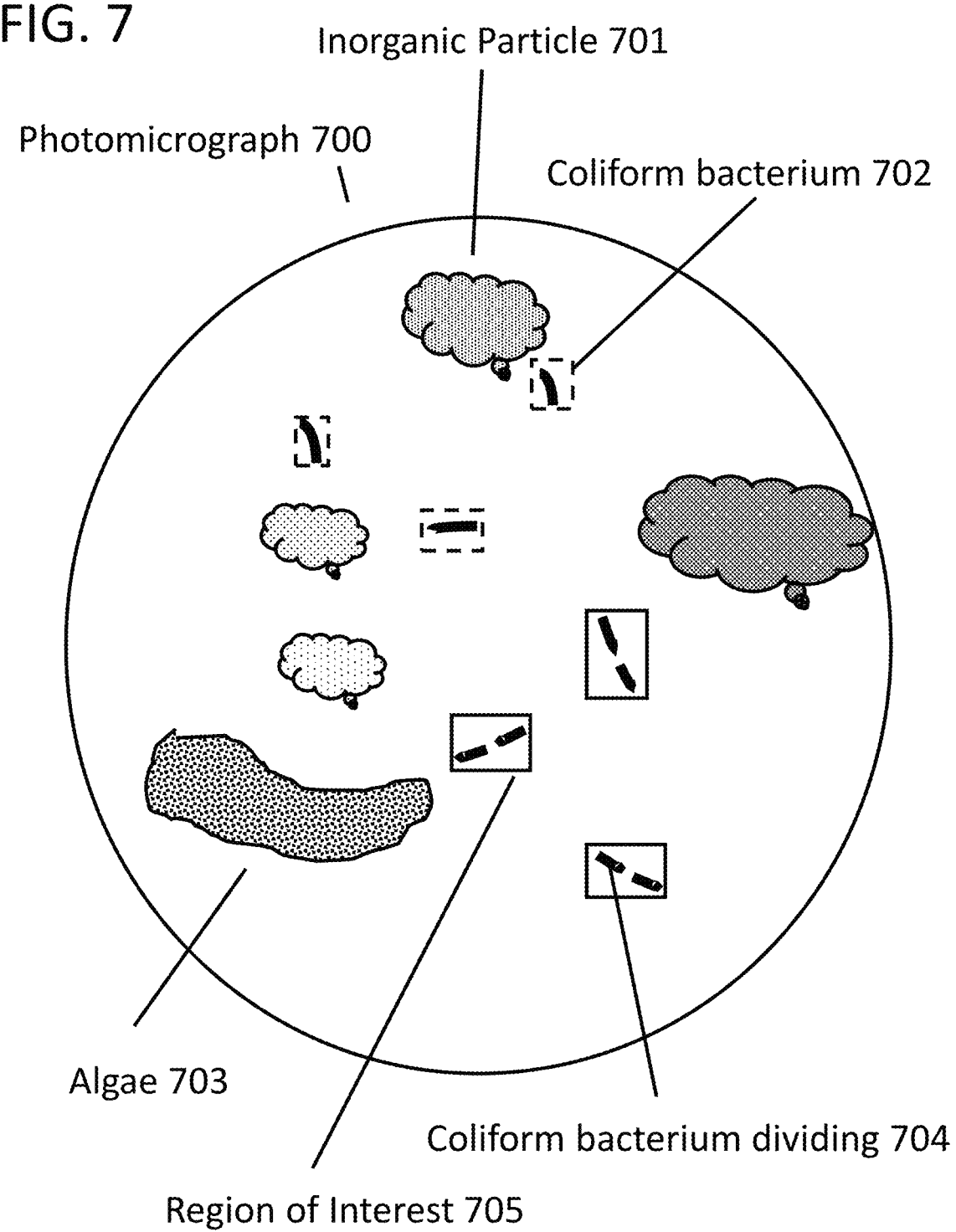
FIG. 7 is a schematic diagram of a micrograph captured by the camera, containing particles of a variety of types, with several interesting ones in bounding-box delimited regions of interest.
Figure 8:
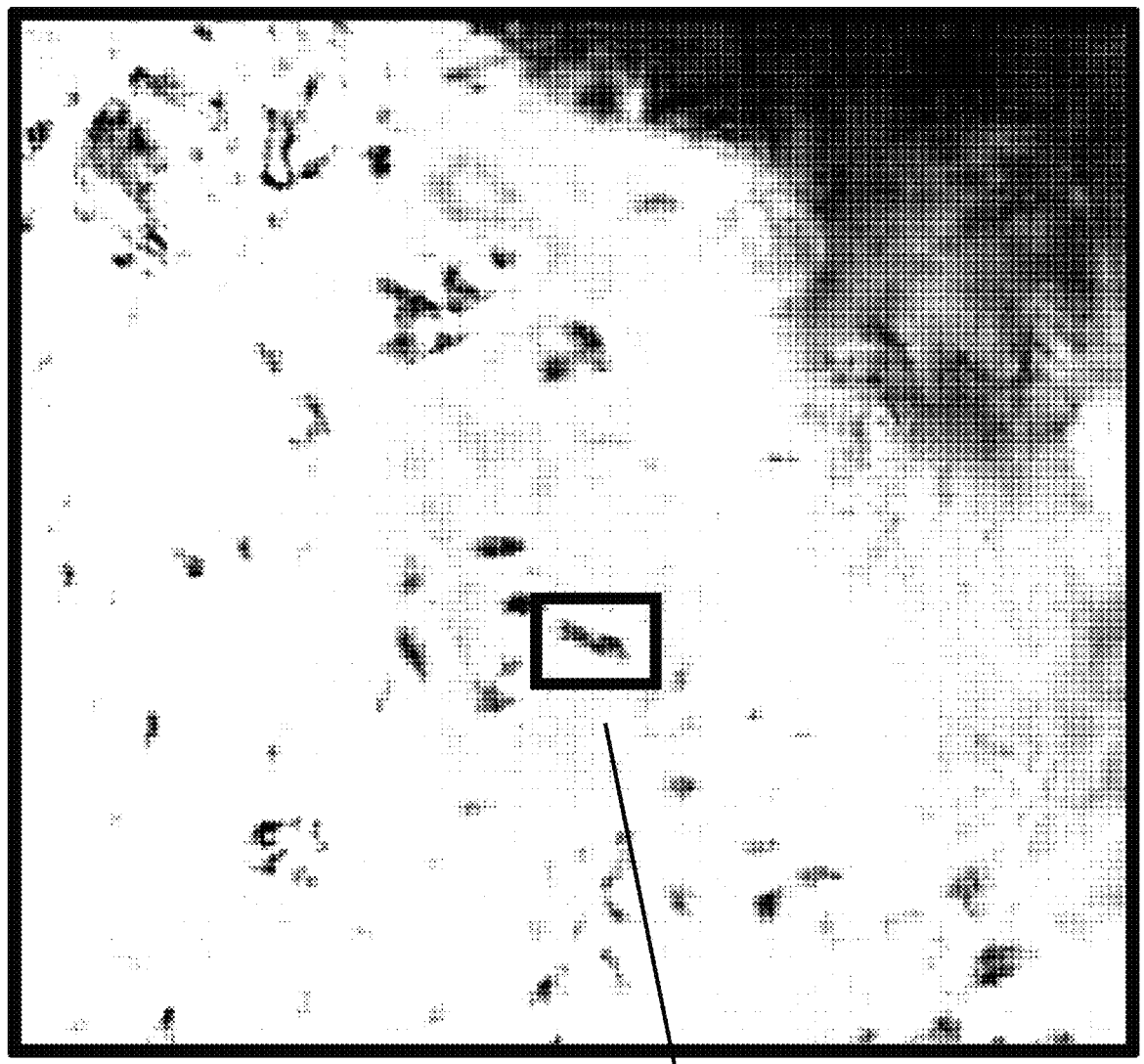
FIG. 8 shows an actual photomicrograph captured by a microscope camera with particles suspended in water, one particle being a coliform bacterium shown in a region of interest delimited by a manually drawn bounding box.
Figure 9:
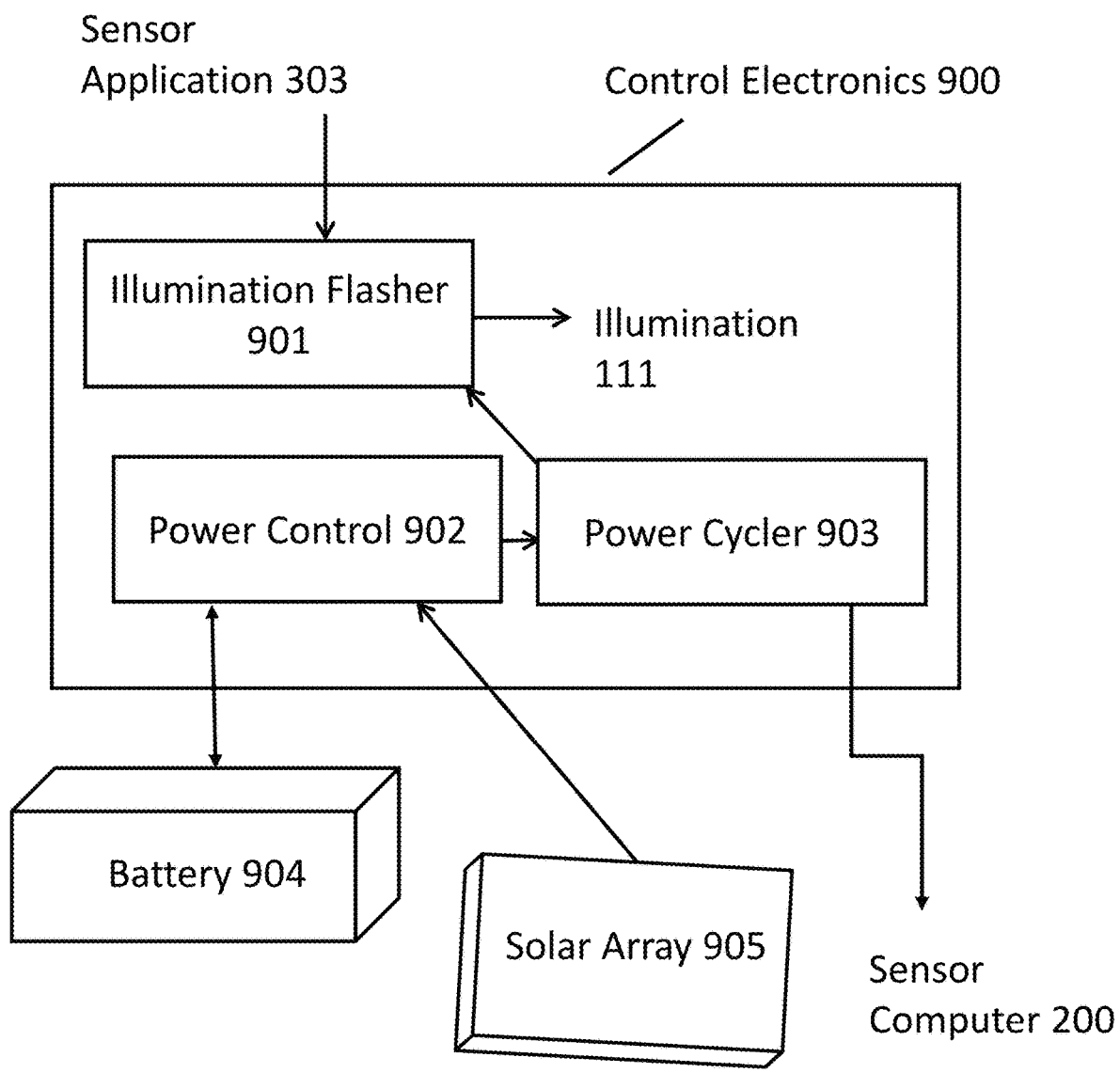
FIG. 9 shows a control electronics unit, connected to supply power to the sensor computer 200 and to flash the illumination 111.

The UV-to-visible converter in FIG. 6 can be used to convert the UV emission to visible for the camera. In order to reduce the 280 nm excitation illumination reaching the camera or fluorescent surface 602, UV wavelength-sensitive optics may be used. These can be of optical glass in various formulations, such as Schott glass UG1, UG5, or UG11 or similar. UV filters are available in a very wide range of high-pass, low-pass, and band-pass types.

UV Converter

The if the particles are producing a UV image, then the camera, if not natively sensitive to UV light, may have a UV-to-visible or UV-to-IR converter at some point in the optical path before it as in FIG. 6. For example, an emission image UV light 605 at 350 nm comes through the window and is focused by UV lens 604 to produce UV particle images 603 on a pane of glass on which there is a layer of fluorescent substance 602, such as commercially available fluorescent ink or paint. The camera then focuses on the ink or paint, observing visible or IR emission light 601. This converter is not the unique way to sense UV light, but is representative.

Combining Imaging Techniques

The above imaging techniques can be combined as well, for example by providing images outputted by multiple cameras i.e. composed observing means 1201 and 1202 to the AI classifier. The observing means 1200 composes the images, e.g. by superimposing them or splitting them or separating them into different classifier channels. The two composed observing means can have different kinds of spectral or other sensitivities, as shown by placing optional filters 1203 and 1205 in the path, although the composed observing means could have differences of their own instead. In one configuration, the filters 1203 or 1205 could be a diffraction grating or prism or other wavelength-dependent spreading means to smear the image of the particles across the image. The light in one configuration is separated into two paths by beam-splitter 1204, which can be a half-silvered mirror, a prism, a diffraction grating or dichroic mirror or other means for splitting the beam. This way, for example, the schematic lens 105 can be shared and the focused regions are the same, or separate lenses could be used beyond the beam splitter. The mirror 1206 brings the optical path back to parallel for convenience of positioning of 1202. Black-and-white or color cameras or hyperspectral cameras or other single or multi-channel cameras can be used. This composition is valuable when combined with the epi-illumination configuration of FIG. 15 and is valuable for the fiber-optic configuration of FIG. 13.

Also, multiple image sources can be composed optically for a single camera, where the camera is the observing means 1200, such as by putting two images from 1201 and 1202 in separate areas of the camera's field of view or superimposing them. In this case, the composed observing means 1201 and 1202 would be optical components such as mirrors and so on that place the multiple images into one image.

Different types of source illumination 504 and 506 can be flashed at different times to put different kinds of information into different images. The RGB channels can be re-purposed individually for different image sources. The classifier is not limited to three channels, and images from various sources can be combined in a variety of ways.

Flexibility of the AI Classification Capability

The object patterns recognized by the AI classifier 202 are not simple outlines, textures, sizes, images or other rigid things, but are very flexible and are combined in interpreting the input. Some current AI object detectors can locate and classify thousands of types of objects in images using many kinds of combined clues. Some free image collections of common objects like ImageNet or MS-COCO contain thousands of images containing a mixture of objects such as people, wine glasses, sofas, and other common objects which can be automatically located and individually classified by object detectors, even when the objects partially occlude each other.

The clues do not need to be recognizable by humans. For example, if a diffraction grating or prism were used to add a smearing of each particle across the image according to a transmission, absorbance or reflectance spectrum of each particle, the AI classifier can use that information combined with the rest in rich and complex ways.

Input to the AI Classifier

The input to the AI classifier 202 is the full images 207, which are represented as tensors. A tensor is a multi-dimensional array of numbers, with one number per pixel in a single-channel image such as a gray scale image, or three numbers per pixel for three-channel RGB color, or any number of channels for purposes combining multiple numbers per pixel in various ways that are not necessarily visualizable. A tensor contains only numbers, typically real numbers or integers, sometimes limited to a range such as from 0 to 1 or from 0 to 255. A single-channel image may optionally use two dimensions for the x and y coordinates, otherwise the tensor uses three dimensions for each image. Multiple images can be grouped into batches by using a further dimension, and further dimensions may be used for other purposes. A given tensor has a fixed ordering of the dimensions, but the meaning of each dimension is context dependent. For example, the first dimension might represent a batch number, the second an x position, the third a y position, and the last dimension three channels for RGB color. The number of channels is not necessarily three.

Output of the AI Classifier

The output of an AI image classifier is at least a set of classifications, being at least a set of pairs of classes and class-associated likelihoods plus possibly other information. The output classes are members of a set of predetermined recognized classes. The likelihoods indicate whether and to what degree the input or parts of the input match predetermined specific abstract patterns for the corresponding recognized classes 1005. The output likelihoods may be non-zero even for multiple output classes. Each class normally has a unique numeric id, starting at 0 or 1, with no gaps, and typically a human-readable unique text name.

A given classifier will always have a certain tendency to make false positive and false negative classifications, and better classifiers make fewer mistakes.

Regions of Interest of the AI Classifier

In one configuration, one or more regions of interest, i.e. RoIs, are further output by the AI classifier 202, an RoI being an indication of a subset of a given image such as a bounding box or segmentation. The configuration without RoIs simplifies the overall system, at the expense of some features.

A bounding box is a rectangle with a location, a width, and a height. A segmentation is like an outline but contains any subset of the pixels of the image, normally relatively well connected. Here we refer primarily to bounding boxes, but segments are equally viable. The schematic image 700 shows an example RoI 705 and RoIs surrounding particles of two classes 702 and 704. Also, the photomicrograph 800 shows a bounding box RoI 801, which was drawn manually on a real micrograph image containing coliform bacteria, *Lactobacillus acidophilus*. RoIs may overlap or cover the same image or image subpart.

The regions of interest can each be classified separately, and may be considered to identify likely independent objects, such as distinct particles, but there is not necessarily a one-to-one correspondence between RoIs and particles, and this ambiguity is resolved in the RoI reducer 1004 and particle analyzer 300. In some configurations, each RoI may be associated with multiple pairs of classes and corresponding likelihoods, but such an RoI can be transformed into an equivalent set of RoIs each covering the same area and each with only one class and likelihood pair. The result is a set of distinct (class, x, y, width, height, likelihood) tuples.

A likelihood is not identical to a probability, but it provides some information about a degree of match, and an increasing likelihood indicates a better match. A typical likelihood is a real number from zero to one, approximately like a probability but not necessarily with a strict interpretation. Sometimes the likelihood is restricted to either zero or one or a subrange, in case a maximum or minimum or a threshold is applied, for example. Herein it is possible in one configuration in some cases for a likelihood to be larger than 1 in order to represent multi-particle RoIs.

Aggregation Regions of Interest

An RoI may match or enclose multiple physical objects in an image, such as when aggregations are being detected rather than individual objects, or when there are classes that match according to a particle density. For example, some bacteria aggregate in connected patterns like plates or chains. Herein, the term particle includes the possibility of patterns of aggregations of objects, where the aggregation, as a whole may or may not be considered as the basic particle.

Density Matching Classes

Some classes can match based on particle density, in which case the particles do not need to be directly connected or have an overall pattern. The density is used for at least the purposes of concentration estimation 309. This can help if the particle density is large. For example, there can be a set of classes for distinct density ranges of E. coli bacteria, or a two-dimensional set for particles of any morphology, each with a particle size range and density range. These density classes can match small particles, which may be hard to match individually. An example density distribution could be classes for ranges such as 0, 1, 2 to 9, 10 to 99, 100 to 999, per image and so on, achieving a logarithmic measurement. It is possible for the density ranges to be non-integer, such as 0, 0.01, 0.1, 1.0 and so on determined by non-integer likelihoods. An overall particle concentration can be calculated based on multiple images, by incorporating these density ranges.

A set of such classes matching various densities of particles can be used to reduce the number of RoIs. RoIs of density-matching classes may tend to overlap, but this is adjusted for by the RoI Reduction 1004, which attempts to reach a pattern of non-overlapping RoIs of these classes. The overlaps can happen because the particles are distributed, and the matching is shift-independent. The likelihood and area of an RoI of a density-matching class can be used in estimating the particle concentration.

An RoI having a given class matching an aggregation or matching multiple particles can match even if there are objects of other classes than the given class contained in it or overlapping it, depending on the training.

The Artificial Intelligence Classifier

The AI classifier 202 classifies full input images 207 from the camera, in one configuration outputting classifications for the entire image or in another configuration outputting a set of regions of interest 208, each containing classifications, or in another configuration, outputting both.

Figure 10:
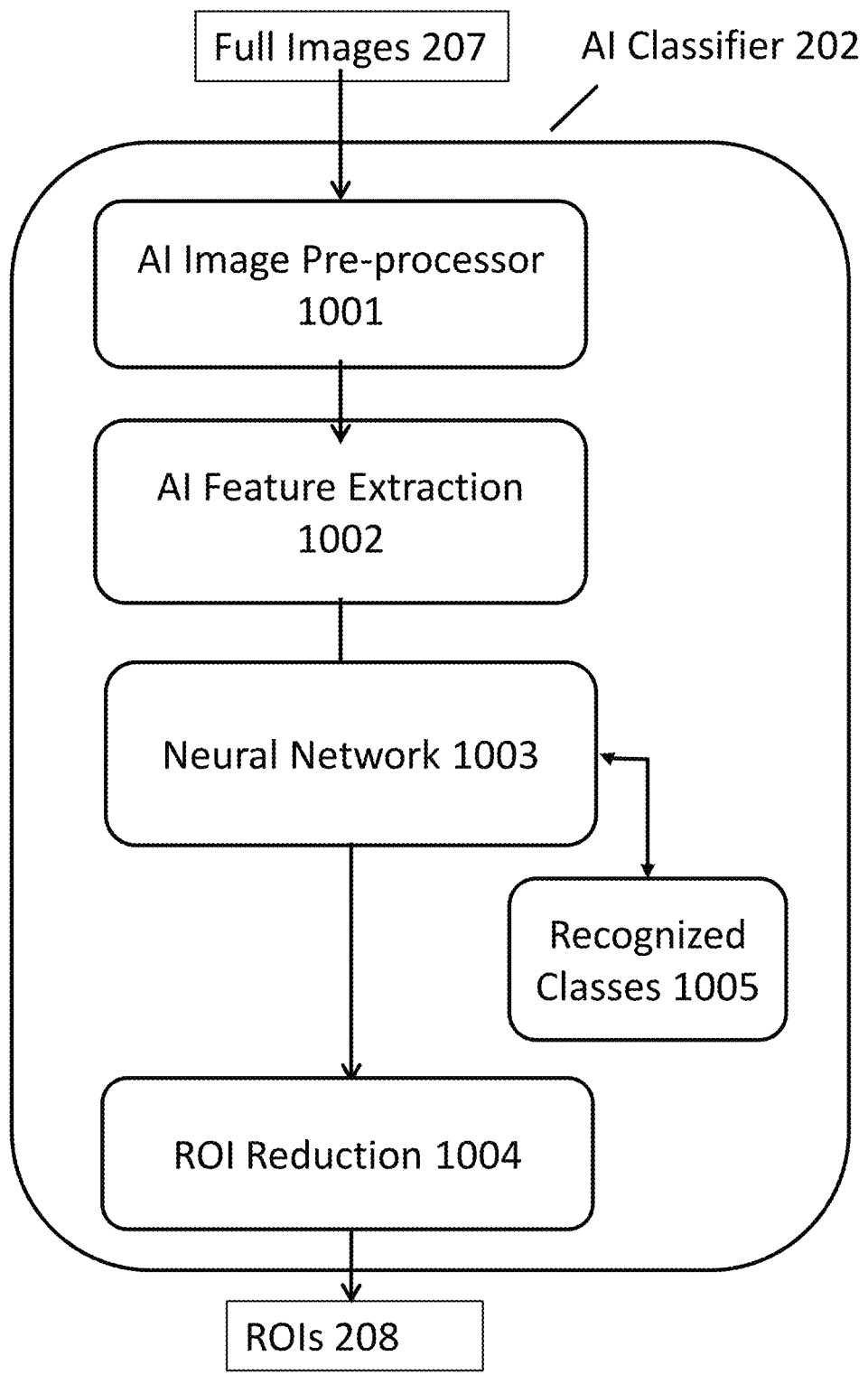
FIG. 10 shows the internal structure of the AI classifier module.

The AI classifier is shown in schematic form in FIG. 10, containing an optional image pre-processor 1001 which performs pixel-at-a time processing specifically for the AI classifier, such as any combination of identity, contrast changing, thresholding, mean density shifting, color mapping, gray-scale conversion, channel number increase and decrease and so on among many well-known or new operations.

An optional feature extractor 1002 converts the image with multi-pixel operations such as one or more of identity, pixel duplication or pooling, max-pooling, edge detection, ridge detection, curve detection, corner detection, blob detection, Hough transform, template matching, or spatial or temporal convolutions, de-convolutions or filtering or any others of many well-known or new possibilities. Further or less image processing may be applied of arbitrary kinds for improving the classification, in any necessary order. The feature extraction 1002 may be instead before the pixel pre-processor 1001 or interleaved with it as needed. However, feature extraction is a basic capability of the neural network as well, and the neural network may not need pre-processing or feature extraction dependent on having appropriate training.

The Neural Network

A convolutional neural network 1003 detects the particle classes and in one configuration also objects in regions of interest within the images outputting them to the optional RoI reducer 1004. The computations performed by an object detector neural network normally are an augmentation of those performed by an underlying image classifier neural network. For example, the single-shot multi-box detector i.e. SSD object detector is a neural network architecture that provides RoI output, and it is associated with a regular underlying image classifier architecture that only classifies entire images. Thus, there is an architecture called ssd_mobilenet_v2, in which the object detector portion is designated by SSD, and the underlying classifier portion is designated by mobilenet_v2. The SSD portion is called a meta-architecture. Also, Faster_RCNN is an object detector meta-architecture.

The neural net 1003 can use a wide range of classification or object detection network architecture i.e. network model selected from at least the well-known free AlexNet, mobilenet, ssd_mobilenet, inception, ssd_inception, exception, r_cnn, fast_rcnn, faster_rcnn, resnet, ssd_resnet, and yolo or others, or custom or further developed network models.

A typical current network model will have a certain fixed input image size, such as 300×300 pixels, while the full images 207 may be much larger, like 640×480 or even HD at 1280×760 or FHD at 1920×1080 or other sizes. The full image 207 can be scaled, thereby magnifying or increasing the relative size of the features, which can be advantageous in classification. The image can also be cropped, and can be divided into subparts, either fixed or moving individually passed to the net 1003. These adjustments can be re-arranged with the processing 1001 and 1002 as needed.

The predetermined recognized classes 1005, if there are more than two, may be effectively logically hierarchical or grouped or generalized internally or externally, either by the AI classifier or by processing applied later. For example, an image or region of interest may contain an object likely to be in multiple classes at once, so a coliform bacterium could be recognized as such, but also simultaneously as one of two other classes, for any kind of dividing and non-dividing cells. Also, the multiple classifications do not need to be tree structured, but can have any overlapping structure, based on prior training of the classifier. There can be a set of related classes, for example, which each correspond to a certain size range of a general particle, thereby providing a size classification independent from any other classification.

In the configuration where the AI classifier 202 does not output RoIs, but only classifications, then the system simplifies, with the RoI reduction 1004, RoI selector 204, and the Image clipper 206 omitted, and with the Particle Analyzer 300 inputting directly from the Neural Network 1003. Also, Image Selector 205 inputs classifications directly from 1003 instead of RoIs 208. Other functions of the system depending on RoI image region information can be omitted, or they can use classifications alone or can use the entire image as the effective region.

RoI Reduction

An optional RoI reduction 1004 makes the set of RoIs more accurate by reducing duplicates and errors, outputting RoIs 208. This addresses RoI location uncertainty, classification uncertainty, and duplicate matches. Location uncertainty includes uncertainty in the x, y position of the bounding box or outline, as well as the size of a bounding box or the shape or area of an outline. Classification uncertainty includes uncertainty due to false positives and false negatives, where a false positive is an RoI whose class is incorrect, and a false negative is the lack of an RoI where one should have matched. During the determination by the network of the RoIs, the location and classification uncertainties are normally balanced by being a weighted sum of two independent functions, one over classification and one over location. For the present system, this balance can be adjusted as needed.

Duplications are multiple RoIs for the same particle, differing somewhat in location, and these increase in frequency as the likelihood decreases. It is common practice to follow an object detector by a threshold function on the likelihoods, which throws away low-likelihood RoIs and keeps all more likely ones, but this loses information in the bits of the likelihood that are desirable to use as much as possible. The setting of the threshold is arbitrary, and there is usually no universally satisfactory value, with 0.5 being sometimes used as a compromise. So, instead the RoI reducer can preserve RoIs of even relatively low likelihood and combine them into fewer possibly more likely RoIs. Far-apart RoIs can be assumed to tend to represent different particles and are not reduced.

Different executions of the classifier i.e. different inference operations on similar images data may produce different classifications and RoIs, so an improvement of results can sometimes be obtained by performing the classification multiple times, collecting the resulting RoIs into a larger set of RoIs, and then reducing those RoIs. This takes advantage of the fact that the images are arriving in groups due to the fluid flow or turbulence rather than one-at-a-time as they are for a microscope image, for example.

In any case, the RoI reduction may optionally be omitted, which may be reasonable if the interesting particles are rare, and appropriate training of the classifier may help.

Reducing RoIs for Density Classes

For classes that match particle densities rather than individual particles or distinct particle aggregations like plates or chains, there may be many duplicates because overlaps can match. For example, a random distribution of unconnected particles will match at many locations, and the concentration calculation will be affected. The RoI reducer 1004 will tend to combine overlapping ROIs for density-measuring classes, changing the class and likelihood as appropriate.

Reducing RoIs by Area Filtering

The RoI reducer can also adjust for scaling. The off-the-shelf object detector network architectures like SSD and Faster-RCNN assume that distant objects have the same characteristics as nearer ones, and they work hard to achieve a scale-independence capability. However, some particles have absolute size dependence. The RoI reducer can simply throw away RoIs for classes that have absolute size dependence when the RoI area is outside a certain range. An *E. coli* bacterium has a fixed size, so an RoI for an *E. coli* class whose area is too small or large is a false match and can be discarded. A density-measuring class can be made to match on a fixed range of the number of particles in the RoI, so its area will determine the size of the constituent particles. This filtering can be done by the particle analyzer 300 or by the RoI reducer or elsewhere. Some particle classes are independent of absolute size, however, such as perhaps algae or sediment, so these would be accepted as is, discarded, or could be given larger allowable size ranges. The size-range filtering can also be adjusted for different magnifications of the optics, so that the *E. coli* still matches if it appears larger or smaller in some optical setups.

In the configuration in which the AI classifier does not output RoIs but only classifications, i.e. it is not an object detector, the size range filtering is not needed. Also, a custom network architecture can simplify or avoid the scaling issue. A custom architecture would be just a classifier with different classes for density, aggregation, and so on.

It is possible that in some configurations the absolute-size scaling considerations can be simplified by adjusting the training data augmentation. In scaling augmentation, sub-parts of an example image are automatically scaled up and used as additional training input, to make the patterns scale independent.

Greedy Method for RoI Reduction

Figure 11:
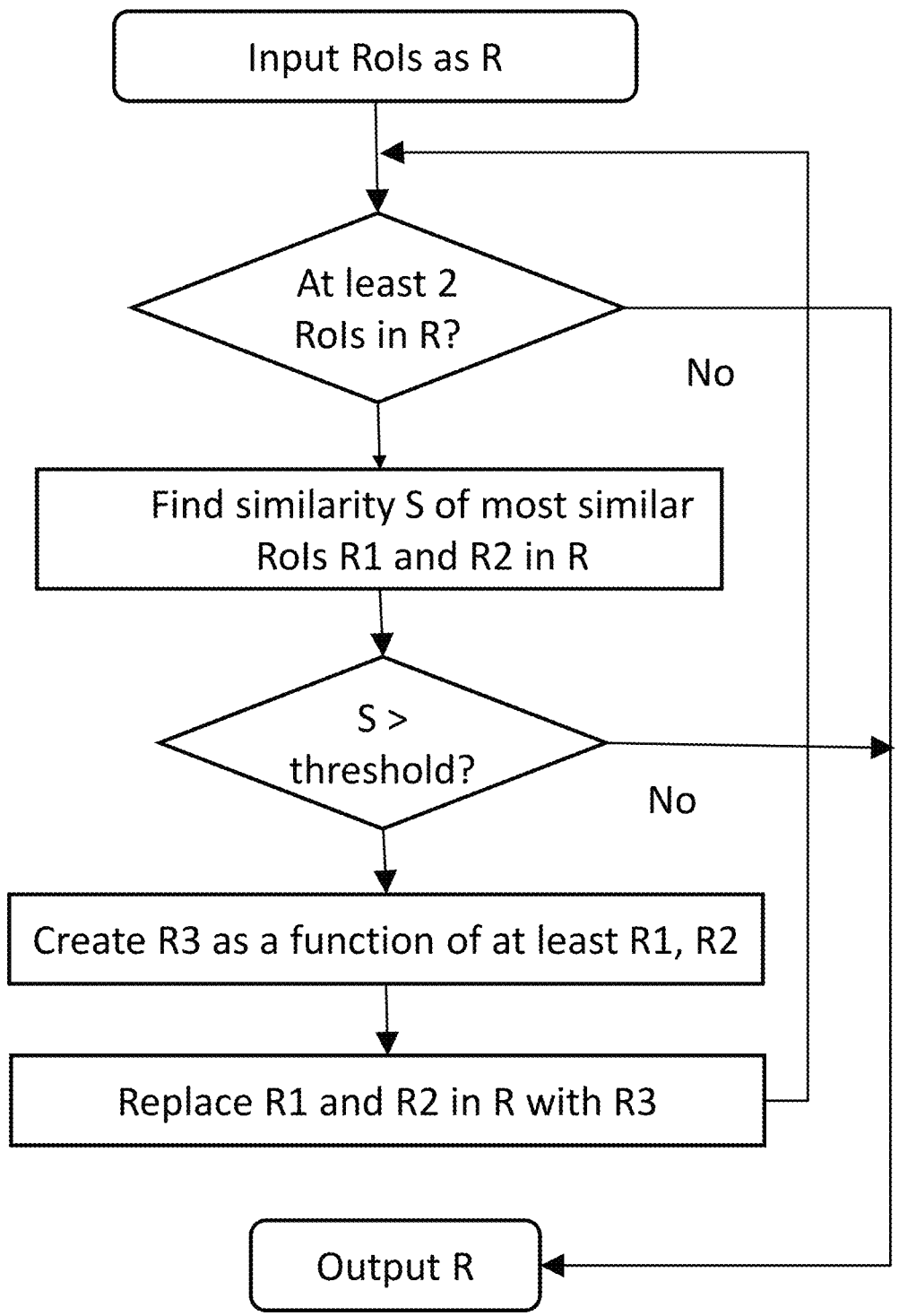
FIG. 11 shows the greedy method for combining similar regions of interest to reduce classification errors and improve concentration estimation.
Figure 12:
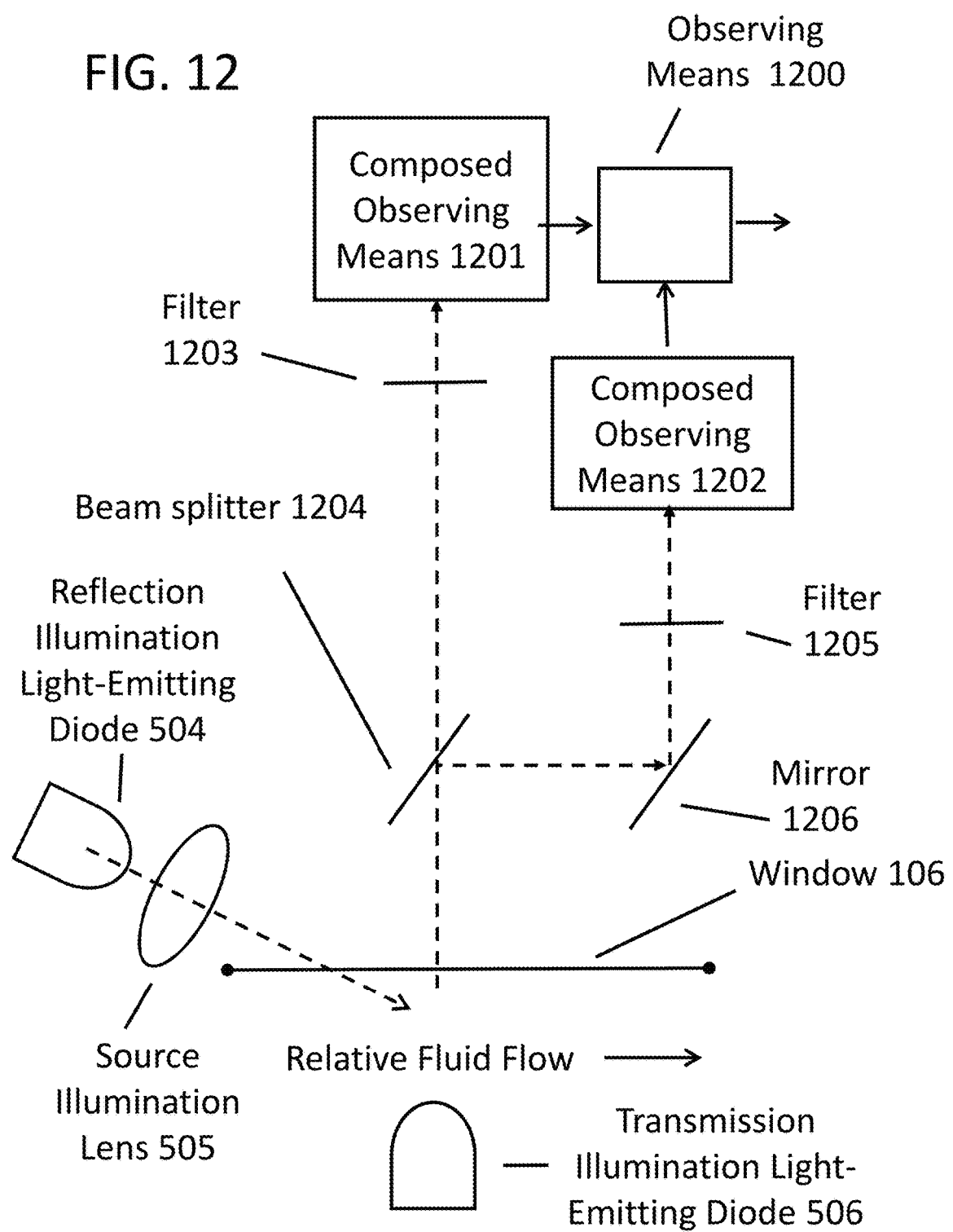
FIG. 12 shows an observing means for composing images together for two cameras, called observing means. Each camera has a separate filter so that it observes a different spectrum, or polarization or other different kind of light or pattern. The images are combined in the observing means.

A flexible greedy method in FIG. 11 for example can reduce RoIs. Each RoI having multiple class and likelihood pairs is first broken into multiple RoIs each having a single class and likelihood but covering the same area. The greedy method iteratively combines the most similar RoIs into one RoI, so long as the similarity values are above a threshold. Improvements to the greedy or other non-greedy or other methods are anticipated.

A similarity function produces a number estimating the likelihood of multiple given RoIs being duplicates, possibly incorporating other information. Then an RoI combining function determines a replacement RoI from multiple given RoIs and possibly other information. The functions are very flexible and can determine a wide range of behaviors. A similarity of RoIs can be judged partially by the ratio of their spatial intersection to their union, i.e. their IoUs. Also, if their classes are different, the similarity could be considered low, even zero, but also higher. The function can be class specific.

The replacement function can generate a replacement RoI from multiple given RoIs by considering many possible factors. For example, it can have a location determined by at least the centroid, a size being a function of at least the sizes, and a likelihood being a function of at least the likelihoods. The replacement RoI can be determined mostly by the most likely given RoI, such as by discarding or down-weighting less likely given RoIs. The function of the likelihoods can be for example a maximum or a weighted sum. The likelihoods are not constrained to be less than one but can be interpreted as indications of a count or density of particles within the RoI. Classification errors tend to be minimized after combining because RoIs containing erroneous classes are rarer and have less likelihood, and better matches tend to produce multiple similar duplicate RoIs that join to form RoIs with higher likelihoods. This works even without any fixed threshold.

For size filtering, the RoI reducer similarity function returns a high value for a wrong-sized RoI to trigger a reduction, and then the replacement function simply ignores the discarded RoI. Or, the RoI reducer can have an extra step for area filtering.

The similarity and replacement functions can be computed for two or more given RoIs at once for various configurations of the method, although FIG. 11 describes the two-at-a-time case. The replacement could also be multiple RoIs.

Concentration Estimation

If RoIs are not available, then a concentration estimation 309 is just determined by the entire set of relevant images. For example, there can be a class that simply matches one or more coliform bacteria in an image, so the concentration is estimated by counting the matching images, possibly weighting by a function of the likelihoods and incorporating the number of images examined. So that high concentrations can be estimated more precisely, there can also be classes that match various ranges of numbers of certain kinds of particles in an image.

Accumulating a count of the RoIs of a given class in one or more images allows a concentration estimation of particles of that class in those images in the particle analyzer 300. The likelihoods attached to the RoIs can be incorporated into concentration estimations 309 for more precision. In one configuration, likelihoods can be larger than 1 for matching multiple particles in an RoI where the class measures density. In one configuration, a function converts the RoI and likelihood into a concentration estimation adjustment which is combined with a total concentration. The area of each RoI can be combined with its likelihood to produce an effective likelihood.

The resulting counts can range from zero to very large numbers because the number of examined images is unlimited, so there is a large dynamic range of concentrations. The concentrations can be estimated in batches or continuously. The concentration estimate computations can be calibrated based on tests of a control fluid containing mixtures of particles of known classes and concentrations. Also, synthetic RoI lists or images can be generated automatically as input to the method to tune it and train it.

Training the AI Classifier

AI image classifier systems require inputting many training images in order to learn how to recognize objects of the desired class or classes. The training input is a set of images, usually along with identifications of the matching classes and optionally also the corresponding object locations within each image. The matching class identifications and their locations within each individual image, if known, are called labels, and the image plus label is called an example. There are normally many training examples, typically between hundreds and millions. A label might, for example, be the name or id of a class of bacteria and the location and size of a region of interest containing it corresponding to a given training image. Some input images may also be provided without the labels. It is sometimes important to provide some images as negative examples which match no classes.

The Classifier Model

The goal of training is to create a model, which is a set of numerical weights and configuration information that determine the operation of a set of artificial neurons organized in a predetermined layered structure in the classifier. The layered structure is called a network architecture. The weights and configuration can be re-used later with the corresponding net model to re-initialize quickly a classifier that responds to new input images based on the previously trained images. The weights and configuration are data loaded into a computer memory by a neural net interpreter software module, the convolutional neural net 1003, so that the module can perform classifications of images. Training is very expensive and slow compared to the use of the model for classifying images once it has been created and loaded into memory.

Transfer Learning

A pre-trained model can learn new similar classes more quickly or with fewer new training examples via transfer learning. For example, a model trained to understand the pattern identifying a bicycle already understands much of the problem of identifying objects in images in general, and it can be trained more quickly with transfer learning to identify new classes such as *Escherichia coli* and *Staphylococcus aureus* bacteria species. The free public models pre-trained on the ImageNet, MS-COCO, Object Image, or other pre-trained image data sets can be used.

However, these pre-trained network models and network architectures have a built-in bias towards objects in three dimensions, in that a distant object of a class is equivalent to a close one. This system needs to avoid such scale-independence, so that absolute particle sizes are matched. For this reason, the training data needs to be handled in a special way, skipping the normal data augmentations in which example images are intentionally sub-sampled and scaled up. A completely custom network architecture and training from scratch can get the best possible results given the special problem addressed here of particle analysis.

Obtaining Training Examples

There are various means for obtaining training examples, one being bulk labeling. In this method, a series of images can be created by spiking a sample water container with a particle of a known class or a mixture of particles of known classes, and passing that through the optical parts of the system, but not the AI classifier, collecting the images and labeling them all with the class names of the known particles. This technique works so long as it is the entire image that is to be labeled rather than including the regions of interest of the particles, which requires more attention.

Humans can be recruited to draw bounding boxes around the particles and classify and label each of them by hand. There are 'crowd worker' groups with many human participants who will do it, image-by-image, even up to hundreds of thousands of images or more. Such training can use a bootstrapping technique in which humans are given pre-classified images with RoIs displayed, and the classifications are incrementally improved rather than being created from scratch. For example, a classifier that can only identify particles in general can be used to pre-select RoIs and present them to a human, who then simply attaches class names to them.

Obtaining Training Images from the Sensor

Images can be obtained from the sensors in the field and fed into the training, and the classifications and regions of interest found in those images by the sensors can be used to help in further labeling by humans or other means. The sensor-classified images give information about the quality and accuracy of the labeling used to do the previous training of the AI classifier in the sensor. In this way, there is a loop in which an improved model is trained based partially on the current sensor output, and the current sensor output is determined by the current model in the sensor with real input, while the sensor's model is upgraded from time to time. The training images are preserved for future re-use.

Pre-trained models for common classes are provided to users in canned software applications so they do not need to do any training but can go directly to analyzing fluid. Improved and new models are provided from time to time.

Frame Rate

The AI classifier is designed to handle a frame rate coming from the camera 100 and camera output 102 as high as possible, to maximize the fluid analysis rate, within other limits like power, size, pixel resolution, or cost. A representative frame rate is one to 60 frames per second. If the focused region is swept clear of fluid and replaced with new fluid on each image or group of images, then the effective flow rate is independent of the actual flow rate, which makes it unnecessary to control the actual flow rate carefully in order to get quantitative, reproducible concentration measurements, thereby simplifying the system.

The focused region may be left incompletely cleared between images in the configuration in which multiple images of the same fluid portion are captured for the purpose of providing the AI classifier more information about particles such as dynamic changes in morphology, aggregation, density or other characteristics.

If the actual flow rate is very low, there will be fewer empty images to discard, and more objects per non-empty image, but this will not affect the results unless the objects overlap too much and hide each other significantly. If the focused region is not swept clear on each frame, there can be a compensation by reducing the concentration estimations, or by the AI classifier or by comparing adjacent images, for example, or by simply discarding some adjacent images covering the same fluid volume. Also, so long as there is some visible area on the image, a compensation can be calculated to determine the fraction of overlap of particles given the ratio between light and dark areas. The AI classifier can identify and compensate for particle overlaps to some extent.

Neural Processing Units

It is currently becoming common for a neural processing unit or NPU to work along with traditional CPUs and GPUs to do specific AI classification at high speed. These NPUs can increase the performance of the sensor because more sample fluid can be analyzed in a given time, reducing the lower limit of detection in concentration, speeding the real-time data collection, increasing the resolution in time, reducing the time taken to analyze a particular amount of fluid, or increasing the relative certainty of the classifications and concentrations outputted. The AI classifier is implemented at least partially in software, but it can still be considered to include such an NPU hardware component.

The Sensor Computer

Figure 2:
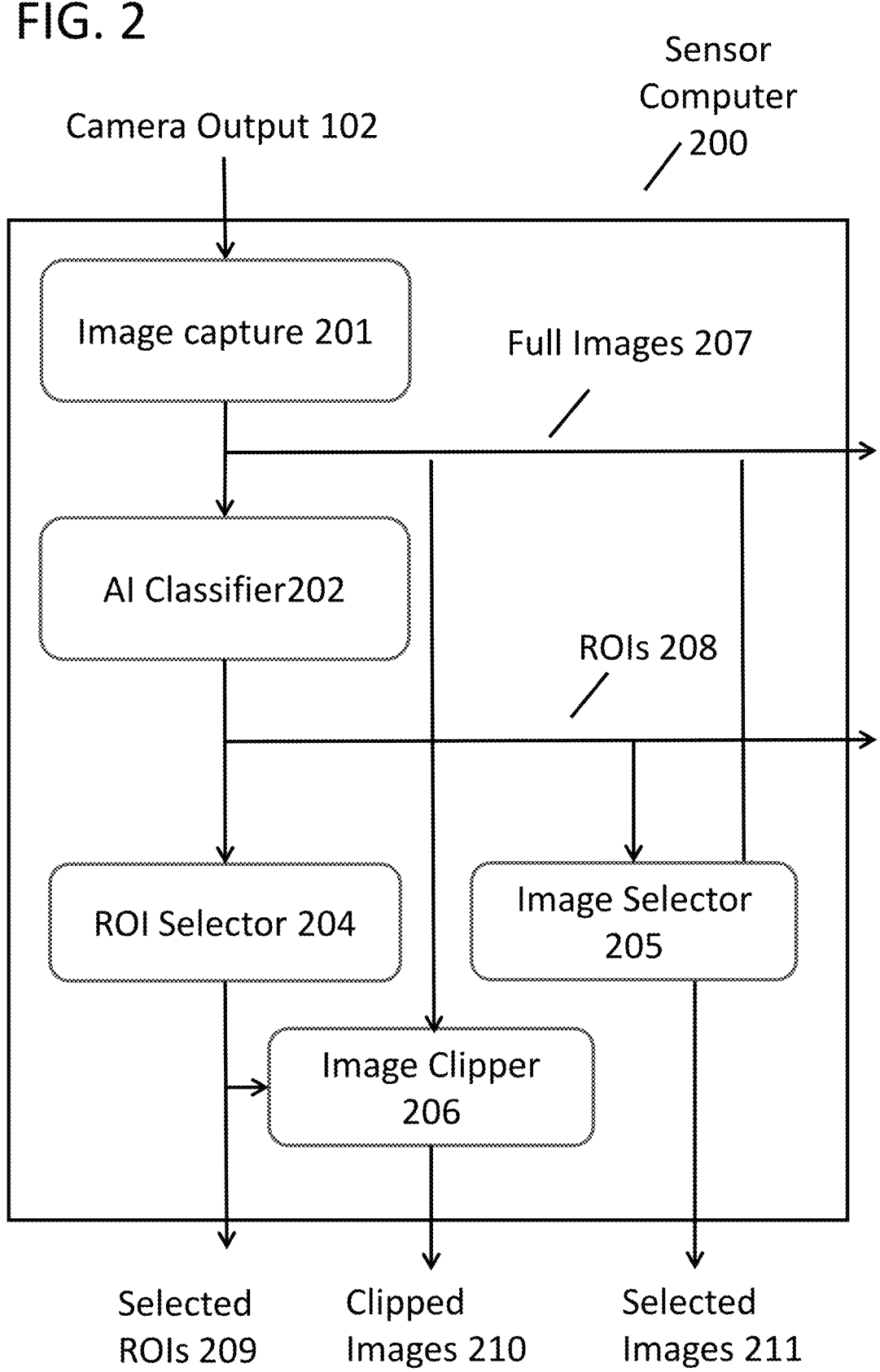
FIG. 2 is software that includes the Artificial Intelligence classifier and surrounding software components, running in the sensor computer with the sensor.
Figure 3:
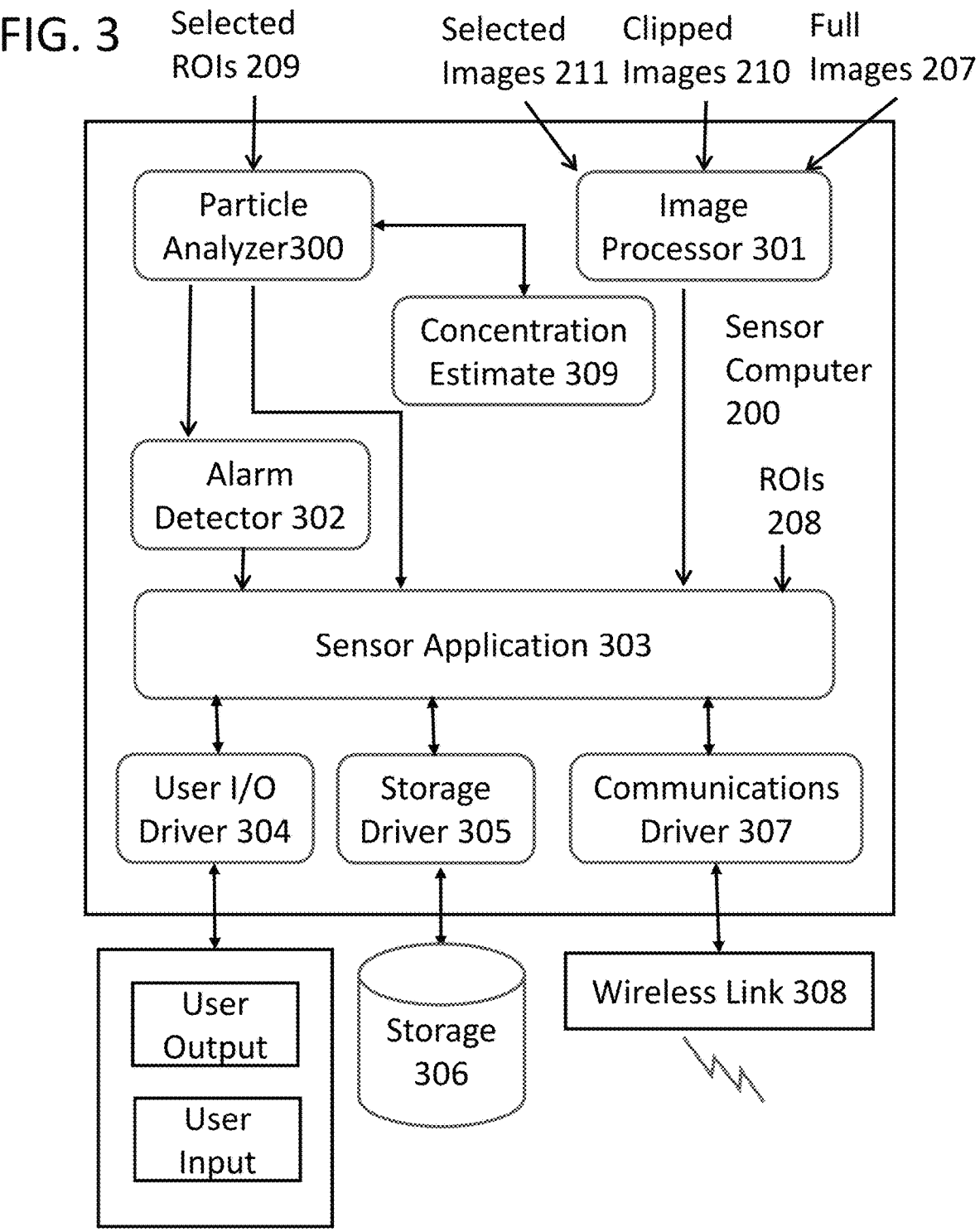
FIG. 3 shows more of the software in the sensor computer.

There is a sensor computer 200 local to the system in the field. This can be, for example, a small single-board computer, or a mobile device, or a laptop, desktop, server or other computer. It controls the system, runs the AI classifier 202 software and the rest of the software in FIG. 2, FIG. 3 and FIG. 10 shown in the rounded-corner boxes and it communicates via the wireless link 308 and other paths. Computer 200 connects via Sensor Application 303 to the local control electronics 900 to interface to the source illumination 111 via the source illumination flasher 901.

Also, the electronics can cycle the power on a schedule with a relatively low duty cycle for low average energy use via the power cycler 903, and it can control via power control 902 the solar array power source 905 or other power source, and to charge and discharge the battery 904 as needed and as sufficient sunlight is available. Other sources of power will work, such as mains, or hydro-generation, or a fixed battery, and so on. The power cycler 903 can use a timer, pre-determined or programmable schedule, external trigger input, or many other techniques to wake up the sensor computer 200, possibly leaving it on for desired lengths of time, or the power related components 902 to 905 can be omitted if the power is reliable and sufficient, such as on mains power.

The sensor computer software 303 uses driver software 304 to allow local user interaction via hardware I/O devices, and it uses driver software 305 to store data in storage hardware 306. Driver 308 connects 303 to wireless link 308. The wireless link 308 can be implemented with or without electromagnetic radiation as needed, or from time to time.

Source Illumination

Currently, there are many types of devices for the source illumination 111 and reflected illumination 504 and transmission illumination 506. There are inexpensive semiconductor Light-Emitting Diodes i.e. LED's for UV, visible, and IR light and semiconductor lasers, mercury vapor lamps, among many other possible sources, even sunlight. 280 nm LEDs available for biological sterilization are appropriate for intrinsic fluorescence excitation, some being very powerful. The illumination need not be of a limited range of wavelengths but can have any spectrum as needed by at least the camera 100, camera electronics 101 and pixel array 103 and lens 105 to produce camera output 102. There may be multiple source illuminations, and they can be statically combined or selected as needed manually or automatically, so any of 504, 505 or 506 might be omitted. LED 506 could be augmented by a lens or other components. The components 504, 505, and 506 are only schematic, and many possible configurations will work. More than two sources can be used.

The illumination lens 505 is optional and only representative, and there could be further lenses or other optics after the illumination sources as desired to increase illumination in the focused region. The illuminations and lens 505 and other source optics may be of a low quality, hence cheaper and less strictly adjusted. Also, an iris can help by making the illumination more-or-less collimated, or a laser can be used for highly collimated illumination to improve the image quality. By putting the source illumination at an angle or offset or by providing a gradient in the source illumination, some transparent particles such as microbes will show up as outlines or dark areas.

In order to freeze the motion of the particles in the image if they are moving too quickly, the source illumination can be pulsed i.e. flashed by the illumination flasher 901. For example, a 100.mu.sec pulse or other duration from an LED can be used on each image frame to be captured. It is possible to flash the source or sources at different wavelengths or with other different characteristics at different times, and to capture multiple images related to them to present to the AI classifier, which are combined for example by image capture 201.

Epi-Illumination

The Source Illumination 1501 can be composed with the light coming from the particles using a beam combiner 1502 so that the reflected light goes back up to an observing means 1500. The combiner 1502 can be a partially-silvered mirror or other component. This is helpful to simplify and combine the optical path, and it is called epi-illumination in microscopes. It is particularly useful in a fiber-optic configuration such as that shown in FIG. 13 for the observing means 1300 and fiber-optic or other kind of image transporter 1301. There is an optional mirror 1503 shown to make the path more convenient and bring the components together.

The Optical Path

Figure 5:
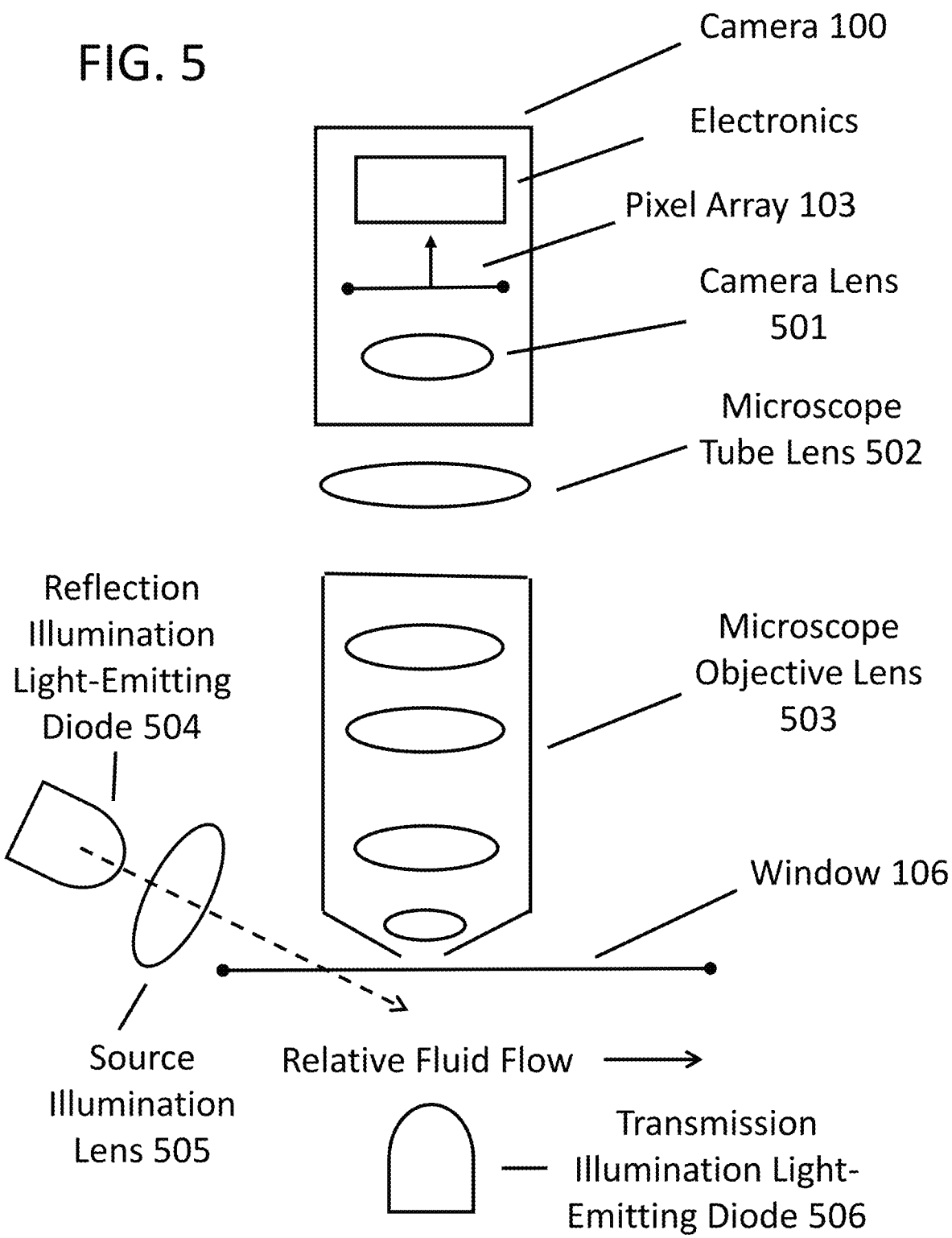
FIG. 5 is a more detailed optical path expanding schematic lens 105 for a configuration based on a microscope optical path. This can be the path of an actual microscope, or it can be custom, using an off-the-shelf Microscope objective lens, tube lens, and camera lens. The schematic lens can be implemented as a holographic array.

The schematic lens 105 can be implemented physically including one or more curved or flat refractive or reflective components as shown in FIG. 5. For example, an off-the-shelf microscope objective lens 503 can be followed by a standard microscope tube lens or lenses 502 and then a lens or lenses 501 internal to the camera. There are standard microscope cameras 100 that can be put in the tube if it is 23.5 mm, 30 mm, or 30.5 mm in diameter, these containing their own additional lens 501. The optical path can simply be that of an actual microscope, with the fluid flowing in a channel across the microscope stage.

The location of the objective with respect to the window is not critical, but the path from the microscope objective 503 through the tube lens 502 and camera lens 501 to the pixel array 103 are improved by being rigid and this can be obtained for example by simply mounting the components together in a stiff tube. The path from the objective 105 or 503 to the focused region 112 is less critical because the focused region position within the fluid or with respect to the window 106 is not critical.

More components may be added as needed to the optical path, such as lenses, prisms, mirrors to fold it for mechanical convenience, filters, polarizers, birefringent components, fiber-optic image transducers, optical waveguides and so on.

Alternatively, the schematic lens 105 can be implemented as a holographic array as in U.S. Pat. No. 8,866,063 Ozcan, in the optical path between the focused region 112 and the pixel array 103. Other wavelength-domain imaging systems can be used as well, using Fourier transforms or holography, in order to transform the physical spatial particle image into final camera space-domain output images 102, or if the camera output is still not space-domain, then image capture 201 finishes the conversion if necessary.

Fiber-Optic Configuration

Figure 13:
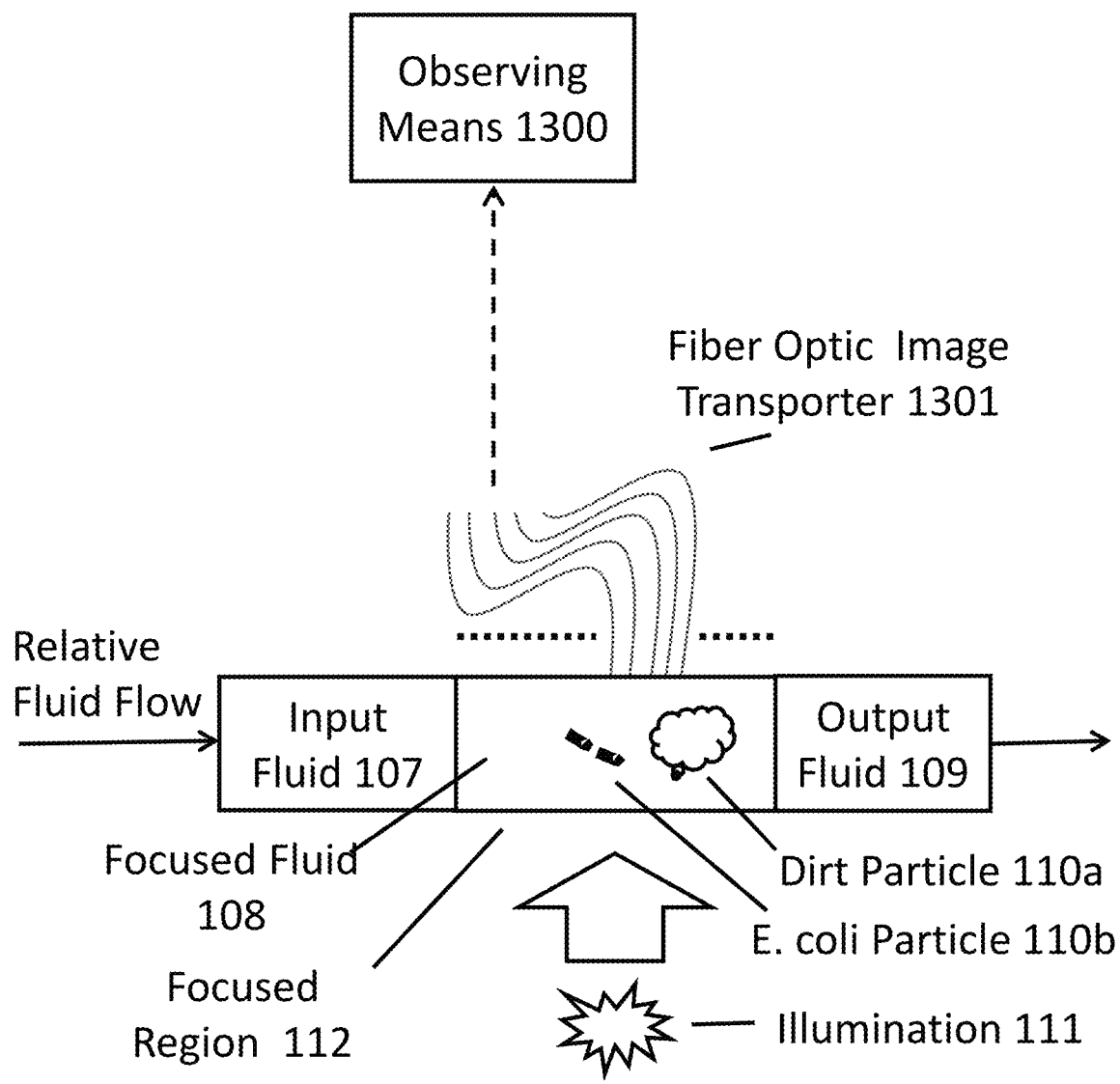
FIG. 13 shows a fiber-optic image transporter with the entry end directly in the fluid without a lens, effectively determining the focused region itself. The focused region is near the surface of the fiber bundle.

In a fiber-optic configuration, the optical path is divided into multiple parts connected by one or more fiber-optic image transporters or optical waveguide image transporters. Fiber optics technology is a well-known means for transporting an image from one place to another, and these are used for example in medical endoscopes for examining internal organs, so that the image source inside and the viewer outside are connected in a flexible way. In this configuration, the fiber optics transports the light of the image from one end to the other of a cable-like or tube-like or other structure from a source optical component in the optical path closer to the window to another destination optical component closer to the camera. Such a configuration allows a source component or probe to be smaller, more easily installed, and more waterproof, among other advantages. The source component can be a box containing the window, a lens, and one end of the fiber optic light conductor, for example, with an optional illumination source. FIG. 13 shows a simpler and smaller configuration with the entry surface of the fiber optic being in the fluid, determining the focused region of the probe thereby avoiding lenses or a window and shrinking the probe.

Sensor Computer Software

The sensor computer runs the software in FIG. 2, FIG. 3 and FIG. 10 in rounded rectangles, and FIG. 11. The camera output 102 is input to image capture 201, providing it via full image output 207. The AI classifier 202 inputs the full images 207, and outputs regions of interest 208 containing likely objects and corresponding likely classes in corresponding bounding boxes to the RoI selector 204 which outputs selected RoIs 209 based on some criterion such as a configuration set by a user. The image selector 205 outputs selected images 211 based on full images 207 and regions of interest 208 based on some criterion. The selected RoIs 209 and full images 207 are used by the image clipper 206 to provide clipped images 210.

The selected RoIs 209 is input to a particle analyzer 300 which converts the raw RoI data into at least recognized particles and concentrations, and which connects to an alarm detector 302 whose output is a control program 303. The alarm detector can, for example, trigger the alarm when the concentration of coliform bacteria reaches a threshold or changes significantly. The alarm detector may incorporate further data, and will have various configuration controls as well, and it can use historical data. An alarm would signal the need to collect on-site water or do more specific analysis to determine the species or strain and pathogenicity. The timing or pattern of a burst or other change carries information that can help localize the cause and determine the risk and necessary response, such as shutting a valve, performing on-site mitigation or broadcasting a public warning.

Image data including at least selected images 211, clipped images 210, and full images 207 is optionally processed by an image processor 301 and output to at least the sensor application 303. The sensor application interacts with users via 304, storage via 305, and the wireless or other kind of link via 308.

The sensor application 303 is very general, and has control, monitoring, input, and output access to all other software modules and components, data flows, and hardware, such as 207 through 211. The sensor application can operate any of these modules in many flexible ways, and the organization of the modules here is not the only one that can be used, since software can be modified easily to re-arrange components, and add or remove processing steps and change inputs and outputs, and change, simplify, or extend the specific functions of the modules. For example, the image processor 301 is very general purpose, and it could be used to process any image data that may become available to the sensor application 303.

Communications

If the system is deployed in a remote area, or if there are many systems, or for other reasons, then it is useful to have wireless communication or other communication for alerts via schematic wireless links 308 and 403.

This can be done with existing satellite technology, for example. It is possible quickly to send and receive arbitrary short messages similar to phone text messages, of about 150 Bytes, at any time, almost anywhere on earth. With this, multiple messages can be strung together to add more information, such as the current concentrations of particle classes.

Also, at any time images and alerts can be retrieved via a higher-bandwidth mechanism, such as 3G, 4G or 5G cellular telephone connections, if available. This can be delayed until an alert is received or it can be routinely performed or on demand. Cell connections or other higher-bandwidth connections are not always available, may not be fast enough, and may have significant cost. In order to minimize costs and increase responsiveness, the data to be retrieved from the system is compressed in various ways, such as by sending only the pixels inside the particles' regions of interest from clipped images 210, sending only images of interesting classes, dropping empty images, using image compression like JPEG and so on.

Many radio frequencies are available beyond those used by cellular phones or other mobile devices, including the ones used in traditional wireless sensor networks including 2.5 GHz, 5 GHz, 900 MHz, 850 MHz, 430 MHz and more, either with direct or meshed i.e.multi-hop networks of nodes, and with simple or directional antennas. The higher frequencies tend to have shorter range, but higher bandwidth. The compression mentioned above is useful for any of these options.

Local Storage

Selected images may also be locally accumulated in storage 306 via driver software 305 such as Flash memory attached to the sensor computer 200. This storage can be navigated by an online accessor user or system locally via driver 304 to the input output devices, or on the other end of a wireless radio or other link 308 via driver software 307 in order to understand better the data collected, such as historical data.

Such retrieved images and data can provide interactive confirmation and explanation of alerts or can be used for general purposes, such as preventive maintenance, risk assessment, or scientific research. The images can increase the confidence in the accuracy of the alerts and data, which is not possible by alternative systems such as networks that simply trigger a warning or provide a measurement of overall inorganic substance concentration. The warnings of such simpler systems have false positives or false negatives which will, if frequent, be ignored by operator users, or which may be missed if the thresholds are set high.

The stored data can include time-based histories of concentrations and images or regions of interest of selected classes at selected times. This interactive navigation is also a form of compression, since much of the data may be left on the local storage unsent, possibly to be erased later. Transmitting all the captured images over a wireless or other link, on the other hand, would often be expensive or slow, and may substantially increase the burden on the communications infrastructure, connected computers, and storage.

Central Cloud Server and Web Site

The data generated and collected by the system can optionally be presented to users on a web site connected to the internet for interactive navigation by server computer 400 and server program 401. The data can have been previously collected by the cloud servers in storage 402 or it can be collected on user demand from sensor computers 200 in the field indirectly via 401. The cloud or on-demand data can be mined for insights and submitted for machine learning. The wireless link can be replaced by a wired link. The server functionality may be broken up over multiple computers, and there may be more computers involved in the data processing overall, such as machine-learning or data mining computers.

The wireless link 403 may be local to or remote from the server 400, such as in a cell tower, Wi-Fi hotspot, or indirectly through a satellite and ground station. The server and user computer may be the same, in which case the wireless link 403 would be accessed by that computer. Instead of a wireless link, a direct connection such as Ethernet or the internet can work as well.

User Computer 410 containing browser 411 connected to the internet allows users to interact with the system via I/O devices 412 and 413.

Arrangement of Software Components

It is not complex to move the software components amongst the described computers. The hardware breakdown of the system described herein is a typical one, with separate sensor computer 200, server computer 400, and user computer 410, but these computers and their software may be combined in various ways. For example, they could be combined entirely into one computer, and some software modules can be implemented together as larger units. In this way, the wireless link may be replaced by a direct connection, socket, inter-process or intra-process communication and so on. An additional feature of most similar cloud servers is an Application Program Interface i.e. API on the server program 401 that allows other programs direct access to the data without a browser or user necessarily being involved. Combining 200, 400, and 410 can yield a convenient laboratory workstation for the system, for example.

AI Classifier Source Code

Figure 4:
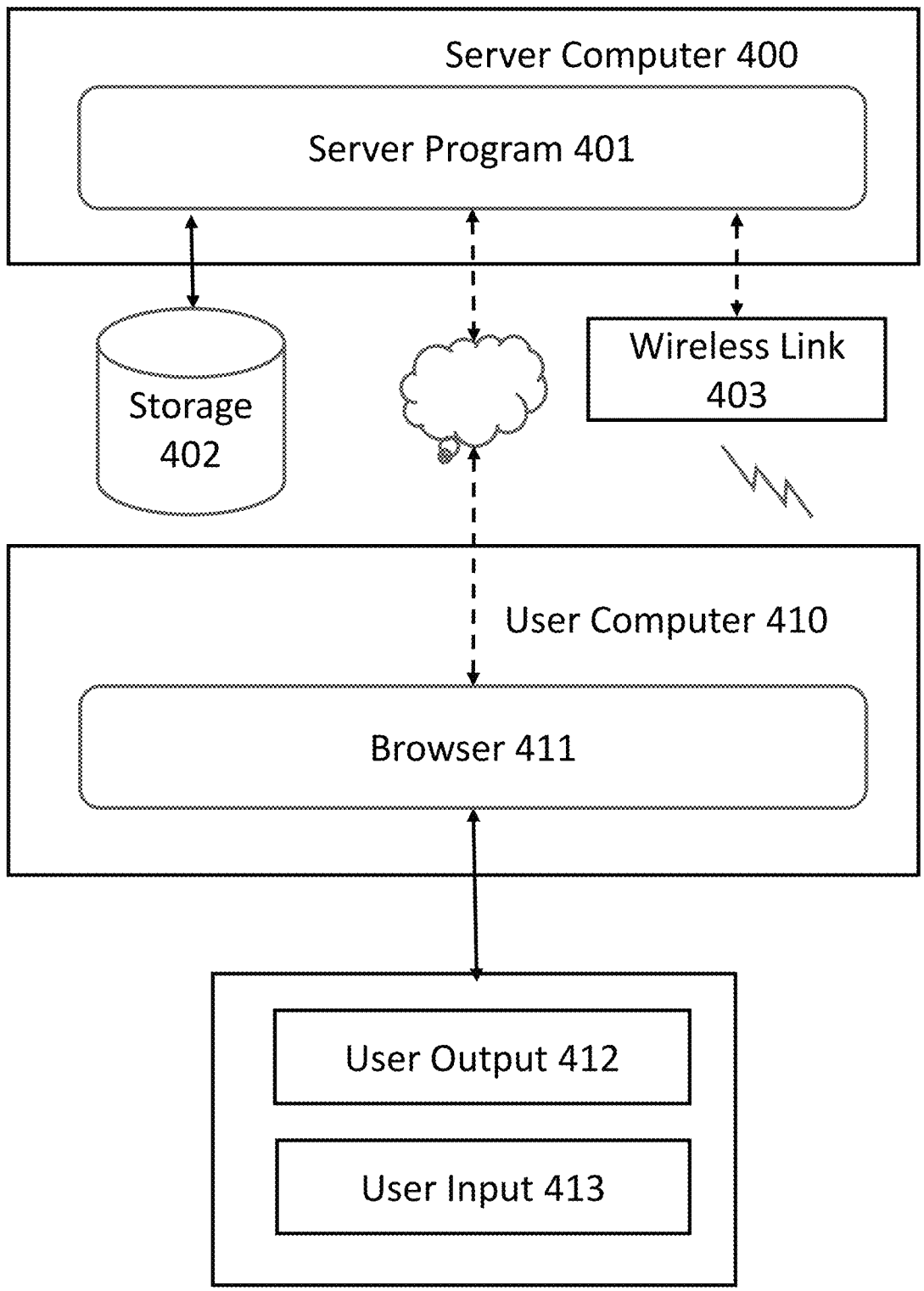
FIG. 4 is a server that collects the sensor data via the wireless link and provides it on demand to the user computer or other computer, which accesses the data via a browser or by application software.

A computer source code listing in the Python programming language is attached which shows how the software modules in rounded rectangles in FIG. 2, FIG. 3, and FIG. 4, and extensions of the modules can be easily implemented using the OpenCV free open-source computer vision image processing software which will be clear to a person having ordinary skill in the art. Such an implementation would have considerable latitude in re-arranging, combining or extending the software modules shown in any of the computers 200, 400, or 410 in the application, as well as moving the modules between computers 200, 400, and 410.

The source code can be understood in English by reading the comment lines, and which occur before most lines of code, except that multiple lines are commented when they have essentially the same purpose. A person having ordinary skill in the art will recognize the elements here necessary to capture images from a camera and run the AI classifier on them, to clip out regions of interest from the full image, to determine the likelihoods of the matches, and to count the number of matches of each class, thereby allowing a determination of a concentration of particles in the fluid.

The classes are determined in this example code by a pre-trained model called ssd_mobilenet_v2_coco_ 2018_03_29. This model is based on an object-detection network architecture called ssd_mobilenet_v2, and it was trained on the MS-COCO data set of thousands of images of objects like persons, chairs and so on. For the AI classifier 202, this model can be used as a basis and can be extended via transfer training, which is much faster than starting from scratch, and which can use the knowledge that the model already has learned relating to the low-level basics of image recognition. The result of the transfer training is a high-quality model that understands a new set of classes. Transfer training may be avoided, starting with only an untrained network architecture like ssd_mobilenet_v2, at the expense of increased training time, increased cost and possibly reduced classification precision.

Software and Data Resources

The pre-trained model is available at the TensorFlow model zoo: http://download.tensorflow.org/models/object detection/ssd_mobilenet_v2_c oco_2018_03_29.tar.gz. The training images are available for download for free at https://cocodataset.org. The OpenCV free open-source computer vision software is at https://opencv.org, and the TensorFlow machine learning software is at https://tensorflow.org.

DETAILED DESCRIPTION OF THE DRAWINGS

FIG. 1:
100 is the camera associated with the sensor computer 200.
101 is electronics inside the camera, which is bundled with the pixel array.
102 is the camera output via USB or other communications to the sensor computer 200.
103 is the pixel array, a CCD or CMOS chip or other illumination-sensitive sensor containing individual pixel sensors in an array, in a linear or rectangular organization.
104a 104b are particle images, being focused from the actual particles in the fluid.
105 is a schematic lens, which represents the actual complete optical path, possibly multiple lenses, to focus the focused region on the pixel array 103 in order to magnify the particles, for example. It may be implemented as a holographic array also.
106 is the window through which the particle in the fluid is observed. This may be a microscope slide, possibly glass or fused silica, or the surface of the fluid, for only a few of many examples. The window may alternatively be placed farther up in the optical path, such as above the lens 105. The window delimits the fluid.
107 is input Fluid entering the focused region that will be scanned in the future for observed particles due to the fluid flow.

108 shows the focused fluid, in the focused region, which is somewhere in the fluid flow, and which includes currently observed particles.

109 shows the fluid exiting the focused region, having been scanned for observed particles.

110a, 110b are particles that are observed. The shapes, sizes, colors, textures, outlines and other very subtle characteristics are used to classify them by the AI classifier 202. 110a is an example sediment particle, much bigger than the 110b dividing *E. coli* bacterium, which is the interesting one, since it is sometimes associated with pathology.

111 is a source of illumination, being some kind of wave, sound, ultraviolet, visible, infrared, an LED, Laser, the sun, and so on. This may be pulsed to freeze the image and be narrow-band or have any spectrum.

112 is the focused region, which is currently observed by camera 100.

FIG. 2:

200 is a sensor Computer located with the camera 100 in the sensor.

201 is an image capture which collects the camera images in the sensor computer and does pre-processing, outputting full images 207.

202 is an artificial intelligence image classifier processor that outputs the regions of interest 208 based on full images 207. In some configurations, 202 outputs only classes applying to the entire image with no location information, so the RoI 208 output is determined by a logical bounding box incorporating the entire image. The term region of interest in general includes the possibility of such full-image RoIs.

204 is a Region of Interest selector that selects RoIs to analyze based on their classes, likelihoods and locations in 208, and possible input from sensor application program 303. Some selected particle classes or low likelihoods may be ignored, for example.

205 is an image selector. Some images 207 may be ignored, such as empty ones. Images containing interesting classes found in RoIs 208 may be selected for, among other possible criteria, such as input from sensor application program 303.

206 is an image clipper that uses selected regions of interest 209 to determine a portion of the full image 207 to clip out and provide as clipped images 210 for efficient storage, communications and display. It may do further image selection based on various criteria or more image processing.

207 are full Images captured directly from the image capture 201, unselected.

208 are regions of Interest identified by the AI classifier 202.

209 are selected RoIs that are to be processed.

210 are clipped images that are created from the full images 207 by removing parts not in a region of interest based on selected RoIs 209.

211 are selected images determined by image selector 205 based on the full images 207 and the RoIs 208.

FIG. 3:

300 shows processing and analysis of RoIs to determine the set of likely particles or likely particle aggregations, by combining RoIs, examining likelihoods, looking at RoI classes, and more. It can compute and infer concentrations and per-particle information.

301 is an image processor, for example to enhance contrast, map colors, provide false color, and possibly much more. This operates on the selected images 211, clipped images 210, and full images 207, or other source of images, from 303 or elsewhere.

302 is an alarm detector that combines information from analyzed particle information from 300 to determine based on a criterion whether a message should be sent to the server or elsewhere to signal interesting conditions via control program 303. Other input to 302 may come from 303 and elsewhere.

303 shows the sensor application module to control the overall system. It has control, monitoring, input, and output access to all other modules, and it can easily be modified and extended as appropriate.

304 is a user I/O driver. Input and output devices for local user interface, which may be a simple part of the sensor device for setup and configuration, or a more elaborate display for general purpose use.

305 is a storage driver which connects to the storage 306.

306 is storage, such as a Flash memory, for example, to store particle information, images, and analysis such as current or historical data as well as general housekeeping data.

307 is a driver to the wireless link.

308 connects to a server via a remote link, such as Wi-Fi, 3G, 4G, or 5G cellular, satellite, or other technology to relay sensor data that eventually reaches the user. The wireless link function may also be supplied by a non-radio, such as Ethernet in some configurations.

309 provides concentration estimates as part of the particle analyzer 300.

FIG. 4:

400 is a server computer, where the sensed data is collected and stored, then provided to users. This might be a cloud computer or on-premises computer for example, but could be combined with 200 or 410. It provides data to outside computers as well.

401 is the sensed data collection, storage, and dispersal software. It provides a web server connected from time to time to browser 411. 402 is the storage containing information from the sensor computer, including historical data already received from the sensor computer.

403 is a wireless Link which communicates particle info, images, analysis, control, configuration and state data with the software 401 via the corresponding link 308 on the sensor computer. In some configurations, the wireless link is hard-wired.

410 is a user computer. The server computer 400 can be used simultaneously as the user computer instead of having them separate.

411 is a browser in the user computer 410. This can alternatively be custom software in the user computer that directly communicates with the server software 401 via an application program interface.

412, 413 is user input and output via browser 411.

FIG. 5:

501 is a camera Lens not shown in FIG. 1, inside the camera body, provided by the camera unit 100.

502 is a tube lens corresponding to the lens inside a microscope that stands between the objective and the eyepiece. This may be possible to omit with suitable optical path engineering.

503 is an objective microscope lens such as an off-the-shelf replacement part. This view includes internal lenses that correct for spherical aberration, the flatness of the image i.e. the plan, color correction, and so on. Only some of these features may be needed, for example, if the illumination is narrowband, so the objective may be simplified with fewer lenses.

504 is a reflection illumination Light-Emitting Diode i.e. LED source illumination. This can produce light in the UV, visible, IR, with any spectrum in various configurations. It can also be a laser, incandescent or fluorescent light, mercury vapor light, and more. It can be flashed to freeze motion in some configurations.

505 is a source Lens which focuses LED 504 light approximately onto the focused region 108. It can also include an iris, filters, polarizers, mirrors, prisms, and more as needed.

506 is a transmission illumination LED like 504.

FIG. 6:

601 shows visible or IR emission light from the fluorescent surface 602.

602 is a fluorescent Surface, transparent with a fluorescent substance that glows in the visible or IR wavelengths when illuminated by the UV emission, absorbance, transmission, or reflection light from the particles 110*a* and 110*b*. This is for example the conversion of the 360 nm intrinsic emission from organic particles when the particles are excited at 280 nm. This could be on the fluid side of the window.

603 are UV Particle Images focused on the fluorescent surface 602.

604 is a UV-transparent lens. This could be on the fluid side of the window.

605 is UV Light traveling from the particles 110*a*, and 110*b* to the fluorescent surface 602. This can pass through not only the schematic UV lens 604 but also further optical components.

FIG. 7:

700 shows a photomicrograph image schematic diagram. This entire image may be stored and be available for download because it contains an interesting particle 704.

701 shows an inorganic particle, such as a sediment particle. These can be somewhat opaque or fuzzy or transparent and are highly variable in size and other characteristics.

702 shows a coliform bacterium, not dividing. This is a potential *E. coli*. Hence a possible pathogen depending on the strain. It is in an RoI, dotted.

703 is a large algae particle, ignored because it is green, hence it is not in a selected RoI. These may be variable sizes.

704 is a coliform bacterium dividing, classified as such by the AI classifier 202. It is captured inside a region of interest, a solid box here, hence it may be counted in a concentration counter and its image may be stored and be available for download.

705 is a region of Interest, drawn here with a bounding box superimposed on the image. The superimposition could be used in a display of a captured image to a user, for example. Regions of Interest could also be segmentations, in which case an outline rather than a bounding box is identified, or individual pixels are considered.

FIG. 8:

800 shows a photomicrograph captured by a microscope camera. A variety of classes of particles is visible. Images could also be in color, e.g. to identify algae, but here the image is shown in shades of gray, and dithered, hence the resolution is artificially low. The image has been contrast-enhanced. This would be output from image capture 201 as full images 207, or output from image selector 205 as selected images 211. Some bacteria are out of focus due to being outside the focused region 108 determined by the depth of field of the camera 100, but the AI classifier 202 may still identify some of these.

801 shows a region of interest drawn manually as a bounding box around a single selected coliform bacterium, a *Lactobacillus acidophilus*. The box is roughly 2.mu.m in size. In practice, a large number of RoIs would likely be determined here because there are many likely coliform images.

FIG. 9:

900 is the control electronics, such as on a single PC board. This could be attached to a Raspberry Pi single-board computer as a HAT i.e. hardware-on-top.

901 is an illumination flasher, which provides power for the illumination 111, and causes the LED 504 or 506 to turn on for a short time from time to time.

902 is the power control that connects to the battery 904 and solar array 905 to keep the battery charged.

903 is the power cycler, which allows the sensor computer 200 to operate non-continuously, at a small duty cycle to prevent the battery from entirely discharging. On mains power, this is not needed.

904 is the battery. This is not used if mains power is available.

905 is a solar array. Other power sources could be used, such as hydro or the mains.

FIG. 10:

1001 is the first stage of AI processing, in which full images 207 are prepared, if necessary, by such means as contrast enhancement, thresholding, and so on of many possible operations specifically for the following neural net 1003.

1002 is a feature extractor, which, if necessary, changes the image into a form that reduces the complexity of the image to make it more efficient for the neural net 1003. For example, edge detection can be performed.

1003 is the convolutional neural net, which is the essential artificial intelligence element that recognizes and outputs classifications and optionally also regions of interest 208 dependent on input images. This may be of the image classifier or object detector variety.

1004 is an RoI reducer 1005 is a set of recognized classes which are determined by the training of the neural net 1003.

FIG. 11

Shows a greedy method for combining RoIs to increase precision and sensitivity, and to provide other advantages.

FIG. 12:

1200 shows an observing means 1201, 1202 show composed observing means inside the observing means.

1203, 1205 show optional filters before 1201 and 1202, to demonstrate wavelength-sensitivity or other sensitivities.

1204 shows a beam-splitter composing the images. 1206 shows a mirror to make placement of 1202 more convenient.

FIG. 13:

1300 An observing means.

1301 A fiber-optic image transporter directly associated with the focused region. This provides a probe-type system.

FIG. 14:

1400 is a diffraction grating or other wavelength-dependent optical component.

FIG. 15:

1500 is an observing means.

1501 is a source illumination sent to the particles via an epi-illumination method.

1502 shows a beam combiner, such as a partially-silvered or dichroic mirror.

1503 shows and optional mirror for convenience.

First Embodiment

In the first embodiment, there is a pair of microscope slides or portions of slides or the equivalent with the fluid flowing between them, on a microscope stage. The microscope can be standard light-field, dark-field, confocal, polarizing, and so on. The slides need not be fully transparent. The two slides form a channel, the top slide being the window. There is a gasket such as silicone glue between parts of the slides that prevents leakage. The water or other fluid is carried in and out by flexible tubes situated at the ends of the slides. The microscope can be used to view the focused region in the channel at any time. A pump or other means may be required to get the water or other fluid to flow, or the container of water to be analyzed can be placed higher than the channel, so that gravity moves the water. The water may already be flowing or be under pressure depending on the source.

Sensor Hardware

The software runs on a Raspberry Pi single-board computer or other computer attached to a camera, the camera being either the standard camera of the Pi connected with a ribbon cable or a microscope-specific camera on a USB port. A standard microscope USB camera fits in where one of the 23.5 mm eyepieces would normally go or on top for a trinocular. The camera typically provides a resolution from 1.3 Mpixels to 16 Mpixels. The Raspberry Pi camera, if used, requires an adapter to replace the eyepiece.

The illumination source can be the microscope's own light and condenser, or an externally provided LED situated on or under the stage near the slides that is static or can be flashed at a desired rate, such as 30 Hz or the camera's frame rate with bright 100 usec pulses or other duration pulses and pulse timings as needed. The Pi controls the flashing via custom electronics on a separate PC board, but the flashing electronics can be avoided if the fluid moves slowly. The flashing is necessary if the particles smear too much in the camera images. The electronics are on a Pi shield board and are triggered by the I/O pins on the Pi. The Pi can use its native pulse-width-modulated output, and it synchronizes the flashing with the images in software. Or, GPIO pins can be pulsed by software. It may be possible to avoid the external PC board if the LED can be attached directly to an output pin of the Pi.

The Pi can be augmented by a neural processing unit or NPU for speed of the AI classifier, which will initially be external, but which will be probably be embedded in a future version of the Pi.

Control Fluid

A control fluid provides a comparison against which to judge the results of analyzing the test fluid, so that for example, absolute particle sizes and concentrations can be determined, and the sensitivity and specificity of the classifier can be determined and calibrated. In this setting, the microbes can optionally be stained in advance to help with the fact that microbes may be relatively transparent. For a control fluid at least, the staining can precede the dilution to minimize reagent use, and the control fluid or the results of its being analyzed can be kept for future tests. The staining of either the control fluid or test fluid requires adding a reagent such as methylene blue or an immunofluorescent label among many possibilities to the fluid, if desired. Staining can be a relatively quick procedure and is optional.

Fluorescence

Fluorescence can be used by providing for source illumination UV LEDs that cause visible emission, such as with approximately 365 nm excitation.

This may be organism dependent. The emission in this case is visible or IR, so it will pass through the microscope lenses. If necessary, a quartz, i.e. fused silicon top slide may be used, which is transparent in UV, to allow the source illumination to reach the fluid. The LED may be very bright, and in that case eye protection would be necessary unless there is a built-in shield over and around the slides. The LED power is nominally 30 mW, a generally safe power level.

Intrinsic Fluorescence

If intrinsic fluorescence via the approximately 280 nm excitation is to be used, a special converter device is interposed between the top slide and the objective lens to convert the approximately 356 nm UV particle emission to visible or IR light. The converter includes a UV-transparent lens and a relatively flat surface with a fluorescent substance that glows visibly when excited by the emission from the particles. It is possible to build a microscope with UV-transparent lenses and a UV-sensitive camera, in which case the converter may be avoided.

The camera focuses on the converter panel via the objective lens to see the visible or IR emission. The converter panel can employ any of various fluorescent glass, plastic, paint, powder, ink, or paper such as but not limited to:

Sodium Salicylate, which glows at 400 nm when excited below 350 nm;

Coronene i.e. superbenzene used in astronomy;

Metachrome II from Photometrics is long-term stable;

Lumogen excitation<450 nm, emission 540 nm . . . 580 nm, but expensive;

Maxmax.com has inks and powders including one with 250 nm excitation.

There may need to be one or more UV filters, such as between the illumination source and the particles, or between the particles and the converter, or between the converter and the objective lens, or between the illumination source and the objective lens, to avoid unwanted leakage of light. The filters may be band-pass, band-stop, low-pass, or high-pass, or have any other transmission spectrum as needed. These filters are simply flat pieces of special glass or plastic in the optical path.

Communications

The Pi can optionally communicate via the internet, such as via Ethernet, Bluetooth, Wi-Fi or cell phone channel or other channel, to relay results to other remote computers, such as the cloud server, from where the results can be presented on a web site or analyzed with machine learning software. Users can access the Pi, locally or remotely, to see the images and data captured locally, for interactive exploration. The Pi's regular HDMI monitor can show the images and data as well.

The free open-source OpenCV image processing software runs in the Pi, doing camera input, AI classification, image processing, and image display as needed. Further software implements the rest of the sensor computer's software in a mixture of Python and Java languages or other languages to handle the OpenCV input and output including classifications, regions of interest, and images or sub-images. The further software may execute in the Pi or in associated devices, such as mobile devices attached via Blue-tooth or WiFi and so on. Hence the sensor computer 200 software functionality may optionally be split between the Pi and a secondary computer.

Second Embodiment

Much of the first embodiment is used in the second, so here mainly differences are described.

A remote system fits in a suitcase-size Pelican-type box, which is water-tight, with glands to protect cables and hoses entering the box. A solar array provides power, with a storage battery. If a good fluid-flow-based energy harvester becomes available, it can be used instead of the solar array.

The water flows through a channel made with 3D-printing using SLA stereo lithography, which can be water-tight. Hoses bring water from a river or other flowing source, or a static water source with a pump or gravity feed or driven by water pressure inside an external distribution pipe, through an optional filter. If the water is static, the box can be placed lower down, and a hose brings the water down by the force of gravity. The exit water is discarded or saved, such as by adding it back into a pre-existing flow. Internal-network monitoring, i.e. INM, can be accommodated by attaching the hoses to an adapter attached to a water distribution pipe. INM is used in monitoring water already in a distribution system of pipes.

The optics are from available microscope components, with a microscope objective lens, and a tube containing a lens connected to a CCD microscope camera attached via USB to a Raspberry Pi computer or other small computer. The tube can be created with 3D printing or injection molding or modified off-the shelf parts and so on.

The Raspberry Pi computer has an optional satellite communications board for short remote-control messages and alerts, and an optional 4G cell phone board for faster communications. These boards can be in the standard available Pi shield formats for simple direct attachment. There is an optional GPS receiver for self-location, so that the location can be transmitted with other data to identify the individual system with minimum effort, even if systems are moved around. There is an option for a neural processing unit to speed the AI. If the system is operated with no radios or links at all, then it can be considered a data logger and is still useful, being physically visited from time to time to collect the accumulated historical data.

Custom electronics can optionally provide for power cycling so the system runs a small fraction of the time, perhaps 10 minutes per hour, in order to minimize power consumption if necessary. If mains power is available, the system runs continuously. The electronics contains a LED flasher as well, connected to the Pi.

The software is described in the first embodiment.

Third Embodiment

This is like the second embodiment, except that the camera is replaced with a cellular smart telephone with an adapter to the optics tube such as is used for adapting cell phones to standard monocular, binocular or trinocular microscopes. The electronics are simplified to the extent that the radio link is provided by the telephone, and the telephone executes the AI software that classifies the particles, and if desired it stores the local images on its local Flash storage, and also if desired, it handles the alerts and remote access. The cell phone has a special App for this purpose. The raspberry Pi single-board computer may be possible to omit, and it may be possible to replace it with a simpler Arduino single-board computer, which has lower power consumption but is much slower, being incapable of handling video. If the illumination source is used in a flashing mode in order to freeze the moving particles for imaging, then there is custom electronics to do it. The cell phone can be charged by a solar array, and it can be located inside the pelican box or outside.

Fourth Embodiment

This is like the first embodiment but uses a cellular telephone attached to the microscope with a typical adapter for this purpose. It uses the cellular telephone for computing, AI, storage if desired, and communication if desired, and so on, like the third embodiment.

Fifth Embodiment

The basic functional components of any of the other embodiments can be optimized with suitable engineering into a smaller, cheaper unit for mass production. 3D printing of parts is used to transition from lower to higher production quantities, and the outer box can be custom, or it can also be 3D printed.

The optical path can use custom lenses instead of pre-existing microscope parts. The optical path is simpler, because regular microscopes need a higher degree of image quality, including many lenses to handle spherical aberration, flat field i.e. the plan feature, chromaticity correction for various colors, and so on. The classifier might optionally use a single color, for example, so the color correction is unnecessary. The camera is integrated into the optical path directly rather than being separate.

Power requirements and size are reduced by including only necessary electronics, so the solar array or other power source is smaller, less expensive, and more convenient. A small number of PC boards—ideally one—combines all the electronics, for small size and low cost.

Sixth Embodiment

The sixth embodiment has the same functional components as the others, but it has an external window configuration. The window is on the outside of a container holding optical components or other components as necessary inside.

The window can be placed directly below or at or above the surface of a water body such as a stream, a lake, an ocean, or a fluid in a bottle, or other locations. The container can be placed above the surface looking down, or it can be partially or completely submerged in the water, so that the focused region is within the water. The particles have no inherent size limitations.

With a fiber-optic configuration, the container with the window can be minimized and can be separated from the bulkier components, thereby forming a probe. In the configuration of FIG. 13, the probe is minimal, being only the end of the fiber optic bundle.

The probe configuration can be used conveniently inside objects containing flowing fluid, such as in an organism including a living body.

What is claimed is:
1. A fluid suspended particle classifier system comprising:
   a camera for capturing a plurality of input images, wherein each input image is represented by an illuminated flowing fluid by an illumination source, wherein the fluid contains a particle, the input image of the plurality of the input images having the particle;

an image capture configured to receive the input images, wherein the image capture produces a full image according to a predetermined capture function of at least one of the input images;

an AI image classifier having a convolutional neural network and an image classifier model, wherein the convolutional neural network and the image classifier model are trained to detect particles of at least one predetermined particle class, the classifier model being trained on a plurality of images, each image showing the particle of the particle class associated with a region of interest, wherein the image classifier model receives a classified image dependent on the full image, the image classifier outputting a classification associated with the classified image, the classification associated with the particle class, the classification associated with the region of interest for the particle in the classified image;

a storage system for receiving information dependent on the classification; and a particle analyzer for inputting the classification and outputting an analysis, the storage system receiving information dependent on the analysis.

2. The system of claim 1, wherein the analysis includes a concentration estimation.

3. The system of claim 1, wherein the analysis determines an alert.

4. The system of claim 1, wherein the input image is determined by the source illumination emitting a flash.

5. The system of claim 1, wherein the input image is determined by a fluorescence of the particle.

6. The system of claim 1, wherein the input image is determined by a smeared spectral response of the particle.

7. The system of claim 1, wherein the camera observes the fluid through an image transporter.

8. The system of claim 1, wherein the region of interest is combined with a second region of interest according to a region of interest reduction.

9. The system of claim 1, wherein a clipped image is dependent on the region of interest and the full image, the storage system receiving information dependent on the clipped image.

10. The system of claim 1, further including a wireless link connecting a sensor computer associated with the camera and the fluid to a server computer, the sensor computer transmitting sensed information dependent on the input images over the wireless link to the server computer, the server computer storing information dependent on the sensed information in a server storage, the fluid including water, the particle being a microbe.

11. A fluid suspended particle classifier method including the steps of:

providing a camera configured to observe a flowing fluid illuminated by an illumination source, wherein the camera is configured to capture a plurality of input images of the fluid, an input image of the input images showing a particle in the fluid;

providing an image capture configured to receive the input images, wherein the image capture produces a full image determined by a predetermined capture function of at least one of the input images;

providing an AI image classifier comprising a convolutional neural network and an image classifier model, providing a wherein the convolutional neural network and the image classifier model trained on a plurality of training images, each image of the training images including an image containing a particle in at least one predetermined class and a region of interest for the particle;

operating the image classifier model receiving a classified image determined by the full image, the image classifier model determining that the particle is in the class, the image classifier model determining a classification associated with the class and the region of interest containing the particle within the classified image;

inputting the region of interest associated with the class to a particle analyzer, and displaying on an user display a screen dependent on an output of the particle analyzer.

12. The method of claim 11, further including selecting a selected region of interest associated with the class by a predetermined region of interest selector function; and creating a clipped image according to a predetermined clipping function, the clipped image dependent on the full image and the selected region of interest, the screen dependent on the clipped image.

13. The method of claim 11, further including inputting the region of interest associated with the class to a particle analyzer, the screen dependent on an output of the particle analyzer.

14. The method of claim 11, wherein the particle is a microbe, wherein the fluid includes water.

15. A fluid suspended particle classifier training method including the steps of:

providing a fluid containing a plurality of particles, at least one of the particles being in a predetermined known class;

capturing a plurality of images by a first camera observing the fluid;

inputting the images and the known class into a convolutional neural network image classifier training system of an AI image classifier;

training the convolutional neural network and an image classification model by the training system of AI image classifier;

capturing a second image by a second camera observing the fluid containing a second particle having the known class;

classifying the second particle into the known class by the AI image classifier, wherein the AI image classifier comprises the convolutional neural network and the image classifier model; and determining a region of interest for the plurality of particles based on an image of the plurality of images by a predetermined region of interest determining function;

inputting the region of interest into the AI image classifier associated with the image and the known class for training the image classifier model;

determining a second region of interest associated with the second particle and the second image according to the image classifier model.

16. The method of claim 15, wherein the region of interest determining function is according to a predetermined previous convolutional neural network classifier model.

17. The method of claim 15, further including determining a preselected image of the plurality of images containing a preselected particle of the plurality of particles based on the preselected particle being classified in a predetermined less specific class according to a predetermined less specific convolutional neural network model, the model being trained on the preselected particle and the preselected image to be more specific for the known class than the less specific model for the less specific class.

18. The method of claim 15, wherein the second particle is a microbe, wherein the second fluid includes water.

* * * * *